US012676159B2

(12) United States Patent
Ekstrand et al.

(10) Patent No.: US 12,676,159 B2
(45) **Date of Patent: *Jul. 7, 2026**

(54) HARMONIC TRANSPOSITION IN AN AUDIO CODING METHOD AND SYSTEM

(71) Applicant: DOLBY INTERNATIONAL AB, Dublin (IE)

(72) Inventors: Per Ekstrand, Saltsjobaden (SE); Lars Villemoes, Järfälla (SE)

(73) Assignee: DOLBY INTERNATIONAL AB, Dublin (IE)

( * ) Notice: Subject to any disclaimer, the term of this patent is extended or adjusted under 35 U.S.C. 154(b) by 149 days.

This patent is subject to a terminal disclaimer.

(21) Appl. No.: 18/905,705

(22) Filed: Oct. 3, 2024

(65) Prior Publication Data

US 2025/0054505 A1 Feb. 13, 2025

Related U.S. Application Data

(63) Continuation of application No. 18/523,067, filed on Nov. 29, 2023, now Pat. No. 12,136,429, which is a (Continued)

(30) Foreign Application Priority Data

Mar. 12, 2010 (WO) ................ PCT/EP2010/053222

(51) Int. Cl.
*G10L 19/022* (2013.01)
*G10L 19/02* (2013.01)
(Continued)

(52) U.S. Cl.
CPC ........ *G10L 19/022* (2013.01); *G10L 19/0212* (2013.01); *G10L 19/24* (2013.01); *G10L 21/038* (2013.01); *G10L 21/04* (2013.01)

(58) Field of Classification Search
CPC ... G10L 19/022; G10L 19/0212; G10L 19/24; G10L 21/038; G10L 21/04
See application file for complete search history.

(56) References Cited

U.S. PATENT DOCUMENTS

| | | | |
|---|---|---|---|
| 4,246,617 A | 1/1981 | Portnoff | |
| 6,584,442 B1 | 6/2003 | Suzuki et al. | |

(Continued)

FOREIGN PATENT DOCUMENTS

| | | | |
|---|---|---|---|
| CN | 1206816 C | 6/2005 | |
| CN | 101233506 A | 7/2008 | |

(Continued)

OTHER PUBLICATIONS

"Technique of Statistical Processing and Spectral Analysis" vol. 30, No. 11, Nov. 1, 2004.

(Continued)

*Primary Examiner* — Bryan S Blankenagel

(57) ABSTRACT

The present invention relates to transposing signals in time and/or frequency and in particular to coding of audio signals. More particular, the present invention relates to high frequency reconstruction (HFR) methods including a frequency domain harmonic transposer. A method and system for generating a transposed output signal from an input signal using a transposition factor T is described. The system comprises an analysis window of length $L_a$, extracting a frame of the input signal, and an analysis transformation unit of order M transforming the samples into M complex coefficients. M is a function of the transposition factor T. The system further comprises a nonlinear processing unit altering the phase of the complex coefficients by using the transposition factor T, a synthesis transformation unit of
(Continued)

order M transforming the altered coefficients into M altered samples, and a synthesis window of length $L_s$, generating a frame of the output signal.

7 Claims, 8 Drawing Sheets

Related U.S. Application Data continuation of application No. 18/164,357, filed on Feb. 3, 2023, now Pat. No. 11,837,246, which is a continuation of application No. 17/954,179, filed on Sep. 27, 2022, now Pat. No. 11,594,234, which is a continuation of application No. 17/409,592, filed on Aug. 23, 2021, now Pat. No. 11,562,755, which is a continuation of application No. 16/827,541, filed on Mar. 23, 2020, now Pat. No. 11,100,937, which is a continuation of application No. 16/027,519, filed on Jul. 5, 2018, now Pat. No. 10,600,427, which is a continuation of application No. 14/881,250, filed on Oct. 13, 2015, now Pat. No. 10,043,526, which is a continuation of application No. 12/881,821, filed on Sep. 14, 2010, now Pat. No. 9,236,061.

(60) Provisional application No. 61/243,624, filed on Sep. 18, 2009.

(51) Int. Cl.
*G10L 19/24* (2013.01)
*G10L 21/038* (2013.01)
*G10L 21/04* (2013.01)

(56) References Cited

U.S. PATENT DOCUMENTS

| | | | |
|---|---|---|---|
| 7,720,677 | B2 | 5/2010 | Villemoes |
| 8,015,018 | B2 | 9/2011 | Seefeldt |
| 8,818,541 | B2 | 8/2014 | Villemoes |
| 2003/0093282 | A1 | 5/2003 | Goodwin |
| 2003/0097260 | A1 | 5/2003 | Griffin et al. |
| 2004/0037437 | A1 | 2/2004 | Symons |
| 2004/0078194 | A1 | 4/2004 | Liljeryd |
| 2004/0078205 | A1 | 4/2004 | Liljeryd et al. |
| 2004/0120309 | A1 | 6/2004 | Kurittu |
| 2005/0094827 | A1 | 5/2005 | McDermott |
| 2006/0080088 | A1 | 4/2006 | Lee |
| 2006/0161427 | A1 | 7/2006 | Ojala |
| 2006/0253209 | A1 | 11/2006 | Hersbach |
| 2007/0027679 | A1 | 2/2007 | Mansour |
| 2007/0078650 | A1 | 4/2007 | Rogers |
| 2007/0083377 | A1 | 4/2007 | Trautmann |
| 2007/0100607 | A1 | 5/2007 | Villemoes |
| 2007/0253576 | A1 | 11/2007 | Bai |
| 2007/0288235 | A1 | 12/2007 | Vaananen |
| 2008/0027711 | A1 | 1/2008 | Rajendran |
| 2008/0043871 | A1 | 2/2008 | Latouche |
| 2008/0052068 | A1 | 2/2008 | Aguilar |
| 2008/0260048 | A1 | 10/2008 | Oomen |
| 2009/0060211 | A1 | 3/2009 | Sakurai |
| 2009/0074197 | A1 | 3/2009 | Neher |
| 2009/0076822 | A1 | 3/2009 | Sanjaume |
| 2009/0271204 | A1 | 10/2009 | Tammi |
| 2009/0319283 | A1 | 12/2009 | Schnell |
| 2009/0325524 | A1 | 12/2009 | Oh |
| 2010/0023322 | A1 | 1/2010 | Schnell |
| 2010/0100390 | A1 | 4/2010 | Tanaka |
| 2011/0054885 | A1 | 3/2011 | Nagel |
| 2011/0112670 | A1 | 5/2011 | Disch |
| 2011/0282675 | A1 | 11/2011 | Nagel |
| 2011/0305352 | A1 | 12/2011 | Villemoes |
| 2012/0008799 | A1 | 1/2012 | Disch |
| 2012/0010880 | A1* | 1/2012 | Nagel .................. G10L 19/008 704/E19.01 |
| 2012/0051549 | A1 | 3/2012 | Nagel |
| 2015/0312676 | A1 | 10/2015 | Ekstrand |

FOREIGN PATENT DOCUMENTS

| | | | |
|---|---|---|---|
| EP | 1382143 | A2 | 1/2004 |
| EP | 1879293 | A2 | 1/2008 |
| JP | 2001-521648 | A | 11/2001 |
| JP | 2005510772 | A | 4/2005 |
| JP | 2008-020913 | A | 1/2008 |
| JP | 2008519290 | A | 6/2008 |
| JP | 6638110 | B2 | 1/2020 |
| RU | 2251795 | C2 | 5/2005 |
| RU | 2256293 | C2 | 7/2005 |
| RU | 2282888 | C2 | 8/2006 |
| WO | 98/57436 | A2 | 12/1998 |
| WO | 2008/081144 | A2 | 7/2008 |
| WO | 2009029032 | A3 | 4/2009 |
| WO | 2009/095169 | A1 | 8/2009 |

OTHER PUBLICATIONS

Bai et al. "Synthesis and Implementation of Virtual Bass System with a Phase-Vocoder Approach", Journal of the Audio Engineering Society 54.11, Nov. 2006, pp. 1077-1091.

Barry et al. "Time and Pitch Scale Modification: A Real-Time Framework and Tutorial", Conference papers, Sep. 2008, pp. 1-8.

Bonada, J. "Audio Time-Scale Modification in the Context of Professional Post-Production" Research work for PhD Program Informatica | Cominicacio digital, 2002, pp. 1-76.

Dolson M: "The Phase Vocoder: A Tutorial" Computer Music Journal, Cambridge, MA, US, vol. 10, No. 4, Dec. 21, 1986 (Dec. 21, 1986), pp. 14-27.

Duxbury et al. "Improved Time-Scaling of Musical Audio Using Phase Locking at Transients", Audio Engineering Society Convention 112, Audio Engineering Society, May 2002, pp. 1-5.

Goodwin, Michael M. "The STFT, Sinusoidal Models, and Speech Modification" Springer Handbook of Speech Processing, Springer Berlin Heidelberg, 2008, pp. 229-258.

Kupryjanow,A. et al "Time-Scale Modification of Speech Signals for Supporting Hearing Impaired Schoolchildren" Signal Processing Algorithms, Architectures, Arrangements, and Applications Conference Proceedings (SPA) Sep. 24-26, 2009, pp. 159-162.

Moulines et al. "Non-Parametric Techniques for Pitch-Scale and Time-Scale Modification of Speech" Speech communication 16.2, 1995, pp. 175-205.

Nagel, F. "A Harmonic Bandwidth Extension Method for Audio Codecs" IEEE International Conference on Acoustics, Speech and Signal Processing, Apr. 19-24, 2009, pp. 145-148.

Nagel, F. et al."A Phase Vocoder Driven Bandwidth Extension Method with Novel Transient Handling for Audio Codecs" AES presented at the 126th Convention, May 7-10, 2009, Munich, Germany.

Neuendorf, M. et al "Detailed Technical Description of Reference Model O of the Cfp on Unified Speech and Audio Coding (USAC)" MPEG Meeting, Oct. 13-17, 2008, pp. 61-63.

Portnoff, Michael "Time-Scale Modification of Speech Based on Short-Time Fourier Analysis" IEEE Transactions on Acoustics, Speech and Signal Processing, Jun. 1981, pp. 374-390.

Portnoff, Michael, "Time Scale Modification of Speech Based on Short-Time Fourier Analysis" Doctoral Thesis, Massachusetts Institute of Technology, Apr. 1978, pp. 1-165.

Ravelli, E. et al."Fast Implementation for Non-Linear Time-Scaling of Stereo Signals" Proc. of the 8th Int. Conference on Digital Audio Effects (DAFx '05), Madrid, Spain, Sep. 20-22, 2005.

Robel, Axel "Signal Modifications Using the STFT" Summer 2006 Lecture on Analysis, Modeling and Transformation of Audio Signals, Institute of Communication Science TU-Berlin IRCAM Analysis/Synthesis Team, Aug. 25, 2006, pp. 1-73.

Schnell, M. et al "MPEG-4 Enhanced Low Delay AAC—a New Standard for High Quality Communication" Audio Engineering

(56) References Cited

OTHER PUBLICATIONS

Society, Convention Paper 7503, presented at the 125th Convention, Oct. 2-5, 2008, San Francisco, CA, USA.
The ML T Sine Window, retrieved from the internet:https://web.archive.org/web/20070703062123/htlp://ccrma.1 ,tanford.edu/-jos/sasp/ML T _Sine_Window.html, retrieved on Sep. 6, 2016, published on Jul. 3, 2007 as per the NayBack machine.
Villemoes, L. et al "Core Experiment Proposal on the USAC eSBR Module" MPEG Meeting, ISO/IEC JTC1/SC29/NG11, Jan. 29, 2009.

* cited by examiner

HARMONIC TRANSPOSITION IN AN AUDIO CODING METHOD AND SYSTEM

CROSS REFERENCE TO RELATED APPLICATIONS

This application is a continuation of Ser. No. 18/523,067 filed Nov. 29, 2023, which is a continuation of Ser. No. 18/164,357 filed Feb. 3, 2023, now U.S. Pat. No. 11,837,246 issued Dec. 5, 2023, which is a continuation of U.S. patent application Ser. No. 17/954,179 filed Sep. 27, 2022, now U.S. Pat. No. 11,594,234 issued Feb. 28, 2023, which is a continuation application of U.S. patent application Ser. No. 17/409,592 filed Aug. 23, 2021, now U.S. Pat. No. 11,562,755 issued Jan. 24, 2023, which is a continuation application of U.S. patent application Ser. No. 16/827,541 filed Mar. 23, 2020, now U.S. Pat. No. 11,100,937 issued Aug. 24, 2021, which is a continuation application of U.S. patent application Ser. No. 16/027,519 filed Jul. 5, 2018, now U.S. Pat. No. 10,600,427 issued Mar. 24, 2020, which is a continuation application of U.S. patent application Ser. No. 14/881,250 filed Oct. 13, 2015, now U.S. Pat. No. 10,043,526 issued Aug. 7, 2018, which is a continuation application of U.S. patent application Ser. No. 12/881,821 filed Sep. 14, 2010, now U.S. Pat. No. 9,236,061 issued Jan. 12, 2016, which claims the benefit of priority to U.S. Provisional Patent Application No. 61/243,624 filed Sep. 18, 2009, and PCT Application No. PCT/EP2010/053222 filed Mar. 12, 2010, all of which are hereby incorporated by reference in their entirety.

TECHNICAL FIELD

The present invention relates to transposing signals in frequency and/or stretching/compressing a signal in time and in particular to coding of audio signals. In other words, the present invention relates to time-scale and/or frequency-scale modification. More particularly, the present invention relates to high frequency reconstruction (HFR) methods including a frequency domain harmonic transposer.

BACKGROUND OF THE INVENTION

HFR technologies, such as the Spectral Band Replication (SBR) technology, allow to significantly improve the coding efficiency of traditional perceptual audio codecs. In combination with MPEG-4 Advanced Audio Coding (AAC) it forms a very efficient audio codec, which is already in use within the XM Satellite Radio system and Digital Radio Mondiale, and also standardized within 3GPP, DVD Forum and others. The combination of AAC and SBR is called aacPlus. It is part of the MPEG-4 standard where it is referred to as the High Efficiency AAC Profile (HE-AAC). In general, HFR technology can be combined with any perceptual audio codec in a back and forward compatible way, thus offering the possibility to upgrade already established broadcasting systems like the MPEG Layer-2 used in the Eureka DAB system. HFR transposition methods can also be combined with speech codecs to allow wide band speech at ultra low bit rates.

The basic idea behind HRF is the observation that usually a strong correlation between the characteristics of the high frequency range of a signal and the characteristics of the low frequency range of the same signal is present. Thus, a good approximation for the representation of the original input high frequency range of a signal can be achieved by a signal transposition from the low frequency range to the high frequency range.

This concept of transposition was established in WO 98/57436 which is incorporated by reference, as a method to recreate a high frequency band from a lower frequency band of an audio signal. A substantial saving in bit-rate can be obtained by using this concept in audio coding and/or speech coding. In the following, reference will be made to audio coding, but it should be noted that the described methods and systems are equally applicable to speech coding and in unified speech and audio coding (USAC).

In a HFR based audio coding system, a low bandwidth signal is presented to a core waveform coder for encoding, and higher frequencies are regenerated at the decoder side using transposition of the low bandwidth signal and additional side information, which is typically encoded at very low bit-rates and which describes the target spectral shape. For low bit-rates, where the bandwidth of the core coded signal is narrow, it becomes increasingly important to reproduce or synthesize a high band, i.e. the high frequency range of the audio signal, with perceptually pleasant characteristics.

In prior art there are several methods for high frequency reconstruction using, e.g. harmonic transposition, or time-stretching. One method is based on phase vocoders operating under the principle of performing a frequency analysis with a sufficiently high frequency resolution. A signal modification is performed in the frequency domain prior to re-synthesising the signal. The signal modification may be a time-stretch or transposition operation.

One of the underlying problems that exist with these methods are the opposing constraints of an intended high frequency resolution in order to get a high quality transposition for stationary sounds, and the time response of the system for transient or percussive sounds. In other words, while the use of a high frequency resolution is beneficial for the transposition of stationary signals, such high frequency resolution typically requires large window sizes which are detrimental when dealing with transient portions of a signal. One approach to deal with this problem may be to adaptively change the windows of the transposer, e.g. by using window-switching, as a function of input signal characteristics. Typically long windows will be used for stationary portions of a signal, in order to achieve high frequency resolution, while short windows will be used for transient portions of the signal, in order to implement a good transient response, i.e. a good temporal resolution, of the transposer. However, this approach has the drawback that signal analysis measures such as transient detection or the like have to be incorporated into the transposition system. Such signal analysis measures often involve a decision step, e.g. a decision on the presence of a transient, which triggers a switching of signal processing. Furthermore, such measures typically affect the reliability of the system and they may introduce signal artifacts when switching the signal processing, e.g. when switching between window sizes.

The present invention solves the aforementioned problems regarding the transient performance of harmonic transposition without the need for window switching. Furthermore, improved harmonic transposition is achieved at a low additional complexity.

SUMMARY OF THE INVENTION

The present invention relates to the problem of improved transient performance for harmonic transposition, as well as assorted improvements to known methods for harmonic transposition. Furthermore, the present invention outlines how additional complexity may be kept at a minimum while retaining the proposed improvements.

Among others, the present invention may comprise at least one of the following aspects:

- Oversampling in frequency by a factor being a function of the transposition factor of the operation point of the transposer;
- Appropriate choice of the combination of analysis and synthesis windows; and
- Ensuring time-alignment of different transposed signals for the cases where such signals are combined.

According to an aspect of the invention, a system for generating a transposed output signal from an input signal using a transposition factor T is described. The transposed output signal may be a time-stretched and/or frequency-shifted version of the input signal. Relative to the input signal, the transposed output signal may be stretched in time by the transposition factor T. Alternatively, the frequency components of the transposed output signal may be shifted upwards by the transposition factor T.

The system may comprise an analysis window of length L which extracts L samples of the input signal. Typically, the L samples of the input signals are samples of the input signal, e.g. an audio signal, in the time domain. The extracted L samples are referred to as a frame of the input signal. The system comprises further an analysis transformation unit of order M=F*L transforming the L time-domain samples into M complex coefficients with F being a frequency oversampling factor. The M complex coefficients are typically coefficients in the frequency domain. The analysis transformation may be a Fourier transform, a Fast Fourier Transform, a Discrete Fourier Transform, a Wavelet Transform or an analysis stage of a (possibly modulated) filter bank. The oversampling factor F is based on or is a function of the transposition factor T.

The oversampling operation may also be referred to as zero padding of the analysis window by additional (F−1)*L zeros. It may also be viewed as choosing a size of an analysis transformation M which is larger than the size of the analysis window by a factor F.

The system may also comprise a nonlinear processing unit altering the phase of the complex coefficients by using the transposition factor T. The altering of the phase may comprise multiplying the phase of the complex coefficients by the transposition factor T. In addition, the system may comprise a synthesis transformation unit of order M transforming the altered coefficients into M altered samples and a synthesis window of length L for generating the output signal. The synthesis transform may be an inverse Fourier Transform, an inverse Fast Fourier Transform, an inverse Discrete Fourier Transform, an inverse Wavelet Transform, or a synthesis stage of a (possibly) modulated filter bank. Typically, the analysis transform and the synthesis transform are related to each other, e.g. in order to achieve perfect reconstruction of an input signal when the transposition factor T=1.

According to another aspect of the invention the oversampling factor F is proportional to the transposition factor T. In particular, the oversampling factor F may be greater or equal to (T+1)/2. This selection of the oversampling factor F ensures that undesired signal artifacts, e.g. pre- and post-echoes, which may be incurred by the transposition are rejected by the synthesis window.

It should be noted that in more general terms, the length of the analysis window may be $L_a$ and the length of the synthesis window may be $L_s$. Also in such cases, it may be beneficial to select the order of the transformation unit M based on the transposition order T, i.e. as a function of the transposition order T. Furthermore, it may be beneficial to select M to be greater than the average length of the analysis window and the synthesis window, i.e. greater than $(L_a+L_s)/2$. In an embodiment, the difference between the order of the transformation unit M and the average window length is proportional to (T−1). In a further embodiment, M is selected to be greater or equal to $(TL_a+L_s)/2$. It should be noted that the case where the length of the analysis window and the synthesis window is equal, i.e. $L_a=L_s=L$, is a special case of the above generic case. For the generic case, the oversampling factor F may be $$F \geq 1 + (T-1)\frac{L_a}{L_s + L_a}$$

The system may further comprise an analysis stride unit shifting the analysis window by an analysis stride of $S_a$ samples along the input signal. As a result of the analysis stride unit, a succession of frames of the input signal is generated. In addition, the system may comprise a synthesis stride unit shifting the synthesis window and/or successive frames of the output signal by a synthesis stride of $S_s$ samples. As a result, a succession of shifted frames of the output signal is generated which may be overlapped and added in an overlap-add unit.

In other words, the analysis window may extract or isolate L or more generally $L_a$ samples of the input signal, e.g. by multiplying a set of L samples of the input signal with non-zero window coefficients. Such a set of L samples may be referred to as an input signal frame or as a frame of the input signal. The analysis stride unit shifts the analysis window along the input signal and thereby selects a different frame of the input signal, i.e. it generates a sequence of frames of the input signal. The sample distance between successive frames is given by the analysis stride. In a similar manner, the synthesis stride unit shifts the synthesis window and/or the frames of the output signal, i.e. it generates a sequence of shifted frames of the output signal. The sample distance between successive frames of the output signal is given by the synthesis stride. The output signal may be determined by overlapping the sequence of frames of the output signal and by adding sample values which coincide in time.

According to a further aspect of the invention, the synthesis stride is T times the analysis stride. In such cases, the output signal corresponds to the input signal, time-stretched by the transposition factor T. In other words, by selecting the synthesis stride to be T times greater than the analysis stride, a time shift or time stretch of the output signal with regards to the input signal may be obtained. This time shift is of order T.

In other words, the above mentioned system may be described as follows: Using an analysis window unit, an analysis transformation unit and an analysis stride unit with an analysis stride $S_a$, a suite or sequence of sets of M complex coefficients may be determined from an input signal. The analysis stride defines the number of samples that the analysis window is moved forward along the input signal. As the elapsed time between two successive samples is given by the sampling rate, the analysis stride also defines the elapsed time between two frames of the input signal. By consequences, also the elapsed time between two successive sets of M complex coefficients is given by the analysis stride $S_a$.

After passing the nonlinear processing unit where the phase of the complex coefficients may be altered, e.g. by multiplying it with the transposition factor T, the suite or sequence of sets of M complex coefficients may be re-converted into the time-domain. Each set of M altered complex coefficients may be transformed into M altered samples using the synthesis transformation unit. In a following overlap-add operation involving the synthesis window unit and the synthesis stride unit with a synthesis stride $S_s$, the suite of sets of M altered samples may be overlapped and added to form the output signal. In this overlap-add operation, successive sets of M altered samples may be shifted by $S_s$ samples with respect to one another, before they may be multiplied with the synthesis window and subsequently added to yield the output signal. Consequently, if the synthesis stride $S_s$ is T times the analysis stride $S_a$, the signal may be time stretched by a factor T.

According to a further aspect of the invention, the synthesis window is derived from the analysis window and the synthesis stride. In particular, the synthesis window may be given by the formula:

$$v_s(n) = v_a(n)\left(\sum_{k=-\infty}^{\infty}(v_a(n-k\cdot\Delta t))^2\right)^{-1},$$

with $v_s$ (n) being the synthesis window, $v_a(n)$ being the analysis window, and Δt being the synthesis stride $S_s$. The analysis and/or synthesis window may be one of a Gaussian window, a cosine window, a Hamming window, a Hann window, a rectangular window, a Bartlett windows, a Blackman windows, a window having the function $$v(n) = \sin\left(\frac{\pi}{L}(n+0.5)\right),\ 0 \le n < L,$$

wherein in the case of different lengths of the analysis window and the synthesis window, L may be $L_a$ or $L_s$, respectively.

According to another aspect of the invention, the system further comprises a contraction unit performing e.g. a rate conversion of the output signal by the transposition order T, thereby yielding a transposed output signal. By selecting the synthesis stride to be T times the analysis stride, a time-stretched output signal may be obtained as outlined above. If the sampling rate of the time-stretched signal is increased by a factor T or if the time-stretched signal is down-sampled by a factor T, a transposed output signal may be generated that corresponds to the input signal, frequency-shifted by the transposition factor T. The downsampling operation may comprise the step of selecting only a subset of samples of the output signal. Typically, only every $T^{th}$ sample of the output signal is retained. Alternatively, the sampling rate may be increased by a factor T, i.e. the sampling rate is interpreted as being T times higher. In other words, re-sampling or sampling rate conversion means that the sampling rate is changed, either to a higher or a lower value. Downsampling means rate conversion to a lower value.

According to a further aspect of the invention, the system may generate a second output signal from the input signal. The system may comprise a second nonlinear processing unit altering the phase of the complex coefficients by using a second transposition factor $T_2$ and a second synthesis stride unit shifting the synthesis window and/or the frames of the second output signal by a second synthesis stride. Altering of the phase may comprise multiplying the phase by a factor $T_2$. By altering the phase of the complex coefficients using the second transposition factor and by transforming the second altered coefficients into M second altered samples and by applying the synthesis window, frames of the second output signal may be generated from a frame of the input signal. By applying the second synthesis stride to the sequence of frames of the second output signal, the second output signal may be generated in the overlap-add unit.

The second output signal may be contracted in a second contracting unit performing e.g. a rate conversion of the second output signal by the second transposition order $T_2$. This yields a second transposed output signal. In summary, a first transposed output signal can be generated using the first transposition factor T and a second transposed output signal can be generated using the second transposition factor $T_2$. These two transposed output signals may then be merged in a combining unit to yield the overall transposed output signal. The merging operation may comprise adding of the two transposed output signals. Such generation and combining of a plurality of transposed output signals may be beneficial to obtain good approximations of the high frequency signal component which is to be synthesized. It should be noted that any number of transposed output signals may be generated using a plurality of transposition orders. This plurality of transposed outputs signals may then be merged, e.g. added, in a combining unit to yield an overall transposed output signal.

It may be beneficial that the combining unit weights the first and second transposed output signals prior to merging. The weighting may be performed such that the energy or the energy per bandwidth of the first and second transposed output signals corresponds to the energy or energy per bandwidth of the input signal, respectively.

According to a further aspect of the invention, the system may comprise an alignment unit which applies a time offset to the first and second transposed output signals prior to entering the combining unit. Such time offset may comprise the shifting of the two transposed output signals with respect to one another in the time domain. The time offset may be a function of the transposition order and/or the length of the windows. In particular, the time offset may be determined as $$\frac{(T-2)L}{4}.$$

According to another aspect of the invention, the above described transposition system may be embedded into a system for decoding a received multimedia signal comprising an audio signal. The decoding system may comprise a transposition unit which corresponds to the system outlined above, wherein the input signal typically is a low frequency component of the audio signal and the output signal is a high frequency component of the audio signal. In other words, the input signal typically is a low pass signal with a certain bandwidth and the output signal is a bandpass signal of typically a higher bandwidth. Furthermore, it may comprise a core decoder for decoding the low frequency component of the audio signal from the received bitstream. Such core decoder may be based on a coding scheme such as Dolby E, Dolby Digital or AAC. In particular, such decoding system may be a set-top box for decoding a received multimedia signal comprising an audio signal and other signals such as video.

It should be noted that the present invention also describes a method for transposing an input signal by a transposition factor T. The method corresponds to the system outlined above and may comprise any combination of the above mentioned aspects. It may comprise the steps of extracting samples of the input signal using an analysis window of length L, and of selecting an oversampling factor F as a function of the transposition factor T. It may further comprise the steps of transforming the L samples from the time domain into the frequency domain yielding F*L complex coefficients, and of altering the phase of the complex coefficients with the transposition factor T. In additional steps, the method may transform the F*L altered complex coefficients into the time domain yielding F*L altered samples, and it may generate the output signal using a synthesis window of length L. It should be noted that the method may also be adapted to general lengths of the analysis and synthesis window, i.e. to general $L_a$ and $L_s$, at outlined above.

According to a further aspect of the invention, the method may comprise the steps of shifting the analysis window by an analysis stride of $S_a$ samples along the input signal, and/or by shifting the synthesis window and/or the frames of the output signal by a synthesis stride of $S_s$ samples. By selecting the synthesis stride to be T times the analysis stride, the output signal may be time-stretched with respect to the input signal by a factor T. When executing an additional step of performing a rate conversion of the output signal by the transposition order T, a transposed output signal may be obtained. Such transposed output signal may comprise frequency components that are upshifted by a factor T with respect to the corresponding frequency components of the input signal.

The method may further comprise steps for generating a second output signal. This may be implemented by altering the phase of the complex coefficients by using a second transposition factor $T_2$, by shifting the synthesis window and/or the frames of the second output signal by a second synthesis stride a second output signal may be generated using the second transposition factor $T_2$ and the second synthesis stride. By performing a rate conversion of the second output signal by the second transposition order $T_2$, a second transposed output signal may be generated. Eventually, by merging the first and second transposed output signals a merged or overall transposed output signal including high frequency signal components generated by two or more transpositions with different transposition factors may be obtained.

According to other aspects of the invention, the invention describes a software program adapted for execution on a processor and for performing the method steps of the present invention when carried out on a computing device. The invention also describes a storage medium comprising a software program adapted for execution on a processor and for performing the method steps of the invention when carried out on a computing device. Furthermore, the invention describes a computer program product comprising executable instructions for performing the method of the invention when executed on a computer.

According to a further aspect, another method and system for transposing an input signal by a transposition factor T is described. This method and system may be used standalone or in combination with the methods and systems outlined above. Any of the features outlined in the present document may be applied to this method/system and vice versa.

The method may comprise the step of extracting a frame of samples of the input signal using an analysis window of length L. Then, the frame of the input signal may be transformed from the time domain into the frequency domain yielding M complex coefficients. The phase of the complex coefficients may be altered with the transposition factor T and the M altered complex coefficients may be transformed into the time domain yielding M altered samples. Eventually, a frame of an output signal may be generated using a synthesis window of length L. The method and system may use an analysis window and a synthesis window which are different from each other. The analysis and the synthesis window may be different with regards to their shape, their length, the number of coefficients defining the windows and/or the values of the coefficients defining the windows. By doing this, additional degrees of freedom in the selection of the analysis and synthesis windows may be obtained such that aliasing of the transposed output signal may be reduced or removed.

According to another aspect, the analysis window and the synthesis window are bi-orthogonal with respect to one another. The synthesis window $v_s(n)$ may be given by:

$$v(n) = c\frac{v_a(n)}{s(n(\bmod \Delta t_s))},\quad 0 \le n < L,$$

with c being a constant, $v_a(n)$ being the analysis window (311), $\Delta t_s$ being a time stride of the synthesis window and s(n) being given by:

$$s(m) = \sum_{i=0}^{L/(\Delta t_s - 1)} v_a^2(m + \Delta t_s i),\quad 0 \le m < \Delta t_s.$$

The time stride of the synthesis window $\Delta t_s$ typically corresponds to the synthesis stride $S_s$.

According to a further aspect, the analysis window may be selected such that its z transform has dual zeros on the unit circle. Preferably, the z transform of the analysis window only has dual zeros on the unit circle. By way of example, the analysis window may be a squared sine window. In another example, the analysis window of length L may be determined by convolving two sine windows of length L, yielding a squared sine window of length 2L−1. In a further step a zero is appended to the squared sine window, yielding a base window of length 2L. Eventually, the base window may be resampled using linear interpolation, thereby yielding an even symmetric window of length L as the analysis window.

The methods and systems described in the present document may be implemented as software, firmware and/or hardware. Certain components may e.g. be implemented as software running on a digital signal processor or microprocessor. Other component may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the internet. Typical devices making use of the method and system described in the present document are set-top boxes or other customer premises equipment which decode audio signals. On the encoding side, the method and system may be used in broadcasting stations, e.g. in video or TV head end systems.

It should be noted that the embodiments and aspects of the invention described in this document may be arbitrarily combined. In particular, it should be noted that the aspects outlined for a system are also applicable to the corresponding method embraced by the present invention. Furthermore, it should be noted that the disclosure of the invention also covers other claim combinations than the claim combinations which are explicitly given by the back references in the dependent claims, i.e., the claims and their technical features can be combined in any order and any formation.

BRIEF DESCRIPTION OF THE DRAWINGS

The present invention will now be described by way of illustrative examples, not limiting the scope or spirit of the invention, with reference to the accompanying drawings, in which.

DETAILED DESCRIPTION

Figure 1:
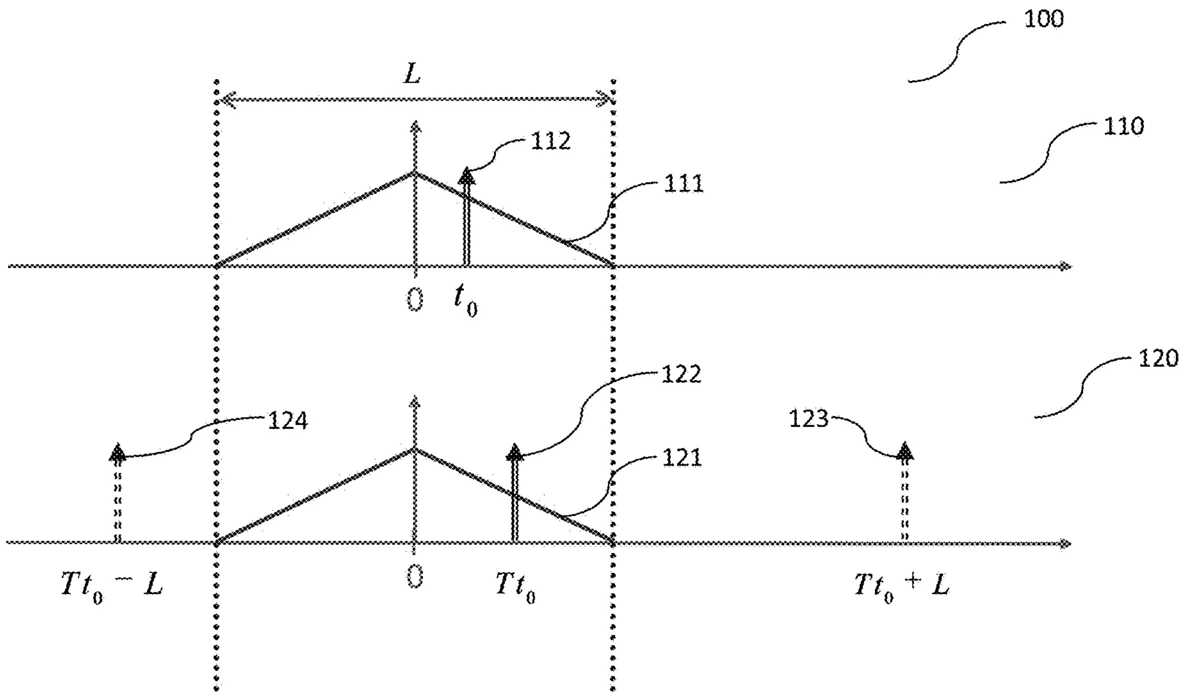
FIG. 1 illustrates a Dirac at a particular position as it appears in the analysis and synthesis windows of a harmonic transposer.

The below-described embodiments are merely illustrative for the principles of the present invention for Improved Harmonic Transposition. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

In the following, the principle of harmonic transposition in the frequency domain and the proposed improvements as taught by the present invention are outlined. A key component of the harmonic transposition is time stretching by an integer transposition factor T which preserves the frequency of sinusoids. In other words, the harmonic transposition is based on time stretching of the underlying signal by a factor T. The time stretching is performed such that frequencies of sinusoids which compose the input signal are maintained. Such time stretching may be performed using a phase vocoder. The phase vocoder is based on a frequency domain representation furnished by a windowed DFT filter bank with analysis window $v_a(n)$ and synthesis window $v_s(n)$. Such analysis/synthesis transform is also referred to as short-time Fourier Transform (STFT).

A short-time Fourier transform is performed on a time-domain input signal to obtain a succession of overlapped spectral frames. In order to minimize possible side-band effects, appropriate analysis/synthesis windows, e.g. Gaussian windows, cosine windows, Hamming windows, Hann windows, rectangular windows, Bartlett windows, Blackman windows, and others, should be selected. The time delay at which every spectral frame is picked up from the input signal is referred to as the hop size or stride. The STFT of the input signal is referred to as the analysis stage and leads to a frequency domain representation of the input signal. The frequency domain representation comprises a plurality of subband signals, wherein each subband signal represents a certain frequency component of the input signal.

The frequency domain representation of the input signal may then be processed in a desired way. For the purpose of time-stretching of the input signal, each subband signal may be time-stretched, e.g. by delaying the subband signal samples. This may be achieved by using a synthesis hop-size which is greater than the analysis hop-size. The time domain signal may be rebuilt by performing an inverse (Fast) Fourier transform on all frames followed by a successive accumulation of the frames. This operation of the synthesis stage is referred to as overlap-add operation. The resulting output signal is a time-stretched version of the input signal comprising the same frequency components as the input signal. In other words, the resulting output signal has the same spectral composition as the input signal, but it is slower than the input signal i.e. its progression is stretched in time.

The transposition to higher frequencies may then be obtained subsequently, or in an integrated manner, through downsampling of the stretched signals. As a result the transposed signal has the length in time of the initial signal, but comprises frequency components which are shifted upwards by a pre-defined transposition factor.

In mathematical terms, the phase vocoder may be described as follows. An input signal x(t) is sampled at a sampling rate R to yield the discrete input signal x(n). During the analysis stage, a STFT is determined for the input signal x(n) at particular analysis time instants $$t_a^k$$

for successive values k. The analysis time instants are preferably selected uniformly through $$t_a^k = k \cdot \Delta t_a,$$

where $\Delta t_a$ is the analysis hop factor or analysis stride. At each of these analysis time instants $$t_a^k,$$

a Fourier transform is calculated over a windowed portion of the original signal x(n), wherein the analysis window $v_a(t)$ is centered around $t_a^k$, i.e. $v_a(t - t_a^k)$.

This windowed portion of the input signal x(n) is referred to as a frame. The result is the STFT representation of the input signal x(n), which may be denoted as:

$$X(t_a^k, \Omega_m) = \sum_{n=-\infty}^{\infty} v_a(n - t_a^k)x(n)\exp(-j\Omega_m n), \text{ where } \Omega_m = 2\pi\frac{m}{M}$$

is the center frequency of the $m^{th}$ subband signal of the STFT analysis and M is the size of the discrete Fourier transform (DFT). In practice, the window function $v_a(n)$ has a limited time span, i.e. it covers only a limited number of samples L, which is typically equal to the size M of the DFT. By consequence, the above sum has a finite number of terms. The subband signals $$X(t_a^k, \Omega_m)$$

are both a function of time, via index k, and frequency, via the subband center frequency $\Omega_m$.

The synthesis stage may be performed at synthesis time instants $$t_s^k$$

which are typically uniformly distributed according to $$t_s^k = k \cdot \Delta t_s,$$

where $\Delta t_s$ is the synthesis hop factor or synthesis stride. At each of these synthesis time instants, a short-time signal $y_k(n)$ is obtained by inverse-Fourier-transforming the STFT subband signal $$Y(t_s^k, \Omega_m),$$

which may be identical to $$X(t_a^k, \Omega_m),$$

at the synthesis time instants $$t_s^k.$$

However, typically the STFT subband signals are modified, e.g. time-stretched and/or phase modulated and/or amplitude modulated, such that the analysis subband signal $$X(t_a^k, \Omega_m)$$

differs from the synthesis subband signal $$Y(t_s^k, \Omega_m).$$

In a preferred embodiment, the STFT subband signals are phase modulated, i.e. the phase of the STFT subband signals is modified. The short-term synthesis signal $y_k(n)$ can be denoted as $$y_k(n) = \frac{1}{M}\sum_{m=0}^{M-1} Y(t_s^k, \Omega_m)\exp(j\Omega_m n).$$

The short-term signal $y_k(n)$ may be viewed as a component of the overall output signal y(n) comprising the synthesis subband signals $$Y(t_s^k, \Omega_m)$$

for m=0 . . . , M−1, at the synthesis time instant $$t_s^k.$$

I.e. the short-term signal $y_k(n)$ is the inverse DFT for a specific signal frame. The overall output signal y(n) can be obtained by overlapping and adding windowed short-time signals $y_k(n)$ at all synthesis time instants $$t_s^k.$$

I.e. the output signal y(n) may be denoted as $$y(n) = \sum_{k=-\infty}^{\infty} v_s(n - t_s^k)y_k(n - t_s^k),$$

where $$v_s(n - t_s^k)$$

is the synthesis window centered around the synthesis time instant $$t_s^k.$$

It should be noted that the synthesis window typically has a limited number of samples L, such that the above mentioned sum only comprises a limited number of terms.

In the following, the implementation of time-stretching in the frequency domain is outlined. A suitable starting point in order to describe aspects of the time stretcher is to consider the case T=1, i.e. the case where the transposition factor T equals 1 and where no stretching occurs. Assuming the analysis time stride $\Delta t_a$ and the synthesis time stride $\Delta t_s$ of the DFT filter bank to be equal, i.e. $\Delta t_a=\Delta t_s=\Delta t$, the combined effect of analysis followed by synthesis is that of an amplitude modulation with the $\Delta t$-periodic function $$K(n) = \sum_{k=-\infty}^{\infty} q(n - k\Delta t), \quad (1)$$

where $q(n)=v_a(n)v_s(n)$ is the point-wise product of the two windows, i.e. the point-wise product of the analysis window and the synthesis window. It is advantageous to choose the windows such that K(n)=1 or another constant value, since then the windowed DFT filter bank achieves perfect reconstruction. If the analysis window $v_a(n)$ is given, and if the analysis window is of sufficiently long duration compared to the stride $\Delta t$, one can obtain perfect reconstruction by choosing the synthesis window according to $$v_s(n) = v_a(n)\left(\sum_{k=-\infty}^{\infty} (v_a(n - k \cdot \Delta t))^2\right)^{-1}. \quad (2)$$

For T>1, i.e. for a transposition factor greater than 1, a time stretch may be obtained by performing the analysis at stride $$\Delta t_a = \frac{\Delta t}{T}$$

whereas the synthesis stride is maintained at $\Delta_s=\Delta t$. In other words, a time stretch by a factor T may be obtained by applying a hop factor or stride at the analysis stage which is T times smaller than the hop factor or stride at the synthesis stage. As can be seen from the formulas provided above, the use of a synthesis stride which is T times greater than the analysis stride will shift the short-term synthesis signals $y_k(n)$ by T times greater intervals in the overlap-add operation. This will eventually result in a time-stretch of the output signal y(n).

It should be noted that the time stretch by the factor T may further involve a phase multiplication by a factor T between the analysis and the synthesis. In other words, time stretching by a factor T involves phase multiplication by a factor T of the subband signals.

In the following it is outlined how the above described time-stretching operation may be translated into a harmonic transposition operation. The pitch-scale modification or harmonic transposition may be obtained by performing a sample-rate conversion of the time stretched output signal y(n). For performing a harmonic transposition by a factor T, an output signal y(n) which is a time-stretched version by the factor T of the input signal x(n) may be obtained using the above described phase vocoding method. The harmonic transposition may then be obtained by downsampling the output signal y(n) by a factor T or by converting the sampling rate from R to TR. In other words, instead of interpreting the output signal y(n) as having the same sampling rate as the input signal x(n) but of T times duration, the output signal y(n) may be interpreted as being of the same duration but of T times the sampling rate. The subsequent downsampling of T may then be interpreted as making the output sampling rate equal to the input sampling rate so that the signals eventually may be added. During these operations, care should be taken when downsampling the transposed signal so that no aliasing occurs.

When assuming the input signal x(n) to be a sinusoid and when assuming a symmetric analysis windows $v_a(n)$, the method of time stretching based on the above described phase vocoder will work perfectly for odd values of T, and it will result in a time stretched version of the input signal x(n) having the same frequency. In combination with a subsequent downsampling, a sinusoid y(n) with a frequency which is T times the frequency of the input signal x(n) will be obtained.

For even values of T, the time stretching/harmonic transposition method outlined above will be more approximate, since negative valued side lobes of the frequency response of the analysis window $v_a(n)$ will be reproduced with different fidelity by the phase multiplication. The negative side lobes typically come from the fact that most practical windows (or prototype filters) have numerous discrete zeros located on the unit circle, resulting in 180 degree phase shifts. When multiplying the phase angles using even transposition factors the phase shifts are typically translated to 0 (or rather multiples of 360) degrees depending on the transposition factor used. In other words, when using even transposition factors, the phase shifts vanish. This will typically give rise to aliasing in the transposed output signal y(n). A particularly disadvantageous scenario may arise when a sinusoidal is located in a frequency corresponding to the top of the first side lobe of the analysis filter. Depending on the rejection of this lobe in the magnitude response, the aliasing will be more or less audible in the output signal. It should be noted that, for even factors T, decreasing the overall stride $\Delta t$ typically improves the performance of the time stretcher at the expense of a higher computational complexity.

In EP0940015B1/WO98/57436 entitled "Source coding enhancement using spectral band replication" which is incorporated by reference, a method has been described on how to avoid aliasing emerging from a harmonic transposer when using even transposition factors. This method, called relative phase locking, assesses the relative phase difference between adjacent channels, and determines whether a sinusoidal is phase inverted in either channel. The detection is performed by using equation (32) of EP0940015B1. The channels detected as phase inverted are corrected after the phase angles are multiplied with the actual transposition factor.

In the following a novel method for avoiding aliasing when using even and/or odd transposition factors T is described. In contrary to the relative phase locking method of EP0940015B1, this method does not require the detection and correction of phase angles. The novel solution to the above problem makes use of analysis and synthesis transform windows that are not identical. In the perfect reconstruction (PR) case, this corresponds to a bi-orthogonal transform/filter bank rather than an orthogonal transform/filter bank.

To obtain a bi-orthogonal transform given a certain analysis window $v_a(n)$, the synthesis window $v_s(n)$ is chosen to follow $$\sum_{i=0}^{L/(\Delta t_s-1)} v_a(m + \Delta t_s i)v_s(m + \Delta t_s i) = c, \quad 0 \le m < \Delta t_s$$

where c is a constant, $\Delta t_s$ is the synthesis time stride and L is the window length. If the sequence s(n) is defined as $$s(m) = \sum_{i=0}^{L/(\Delta t_s - 1)} v_a^2(m + \Delta t_s i), \quad 0 \le m < \Delta t_s,$$

i.e. $v_a(n)=v_s(n)$ is used for both analysis and synthesis windowing, then the condition for an orthogonal transform is $$s(m) = c, \quad 0 \le m < \Delta t_s.$$

However, in the following another sequence w(n) is introduced, wherein w(n) is a measure on how much the synthesis window $v_s(n)$ deviates from the analysis window $v_a(n)$, i.e. how much the bi-orthogonal transform differs from the orthogonal case. The sequence w(n) is given by $$w(n) = \frac{v_s(n)}{v_a(n)}, \quad 0 \le n < L.$$

The condition for perfect reconstruction is then given by $$\sum_{i=0}^{L/(\Delta t_s - 1)} v_a^2(m + \Delta t_s i) w(m + \Delta t_s i) = c, \quad 0 \le m < \Delta t_s.$$

For a possible solution, w(n) could be restricted to be periodic with the synthesis time stride $\Delta t_s$, i.e. $w(n)=w(n+\Delta t_s i)$, $\forall i,n$. Then, one obtains $$\sum_{i=0}^{L/(\Delta t_s - 1)} v_a^2(m + \Delta t_s i) w(m + \Delta t_s i) = w(m) \sum_{i=0}^{L/(\Delta t_s - 1)} v_a^2(m + \Delta t_s i) = w(m)s(m) = c, \quad 0 \le m < \Delta t_s.$$

The condition on the synthesis window $v_s(n)$ is hence $$v_s(n) = w(n(\operatorname{mod} \Delta t_s)) v_a(n) = c\frac{v_a(n)}{s(n(\operatorname{mod} \Delta t_s))}, \quad 0 \le n < L.$$

By deriving the synthesis windows $v_s(n)$ as outlined above, a much larger freedom when designing the analysis window $v_a(n)$ is provided. This additional freedom may be used to design a pair of analysis/synthesis windows which does not exhibit aliasing of the transposed signal.

To obtain an analysis/synthesis window pair that suppresses aliasing for even transposition factors, several embodiments will be outlined in the following. According to a first embodiment the windows or prototype filters are made long enough to attenuate the level of the first side lobe in the frequency response below a certain "aliasing" level. The analysis time stride $\Delta t_a$ will in this case only be a (small) fraction of the window length L. This typically results in smearing of transients, e.g. in percussive signals.

According to a second embodiment, the analysis window $v_a(n)$ is chosen to have dual zeros on the unit circle. The phase response resulting from a dual zero is a 360 degree phase shift. These phase shifts are retained when the phase angles are multiplied with the transposition factors, regardless if the transposition factors are odd or even. When a proper and smooth analysis filter $v_a(n)$, having dual zeros on the unit circle, is obtained, the synthesis window is obtained from the equations outlined above.

In an example of the second embodiment, the analysis filter/window $v_a(n)$ is the "squared sine window", i.e. the sine window $$v(n) = \sin\left(\frac{\pi}{L}(n + 0.5)\right), \; 0 \le n < L$$

convolved with itself as $v_a(n)=v(n)\otimes v(n)$. However, it should be noted that the resulting filter/window $v_a(n)$ will be odd symmetric with length $L_a=2L-1$, i.e. an odd number of filter/window coefficients. When a filter/window with an even length is more appropriate, in particular an even symmetric filter, the filter may be obtained by first convolving two sine windows of length L. Then, a zero is appended to the end of the resulting filter. Subsequently, the 2L long filter is resampled using linear interpolation to a length L even symmetric filter, which still has dual zeros only on the unit circle.

Overall, it has been outlined, how a pair of analysis and synthesis windows may be selected such that aliasing in the transposed output signal may be avoided or significantly reduced. The method is particularly relevant when using even transposition factors.

Another aspect to consider in the context of vocoder based harmonic transposers is phase unwrapping. It should be noted that whereas great care has to be taken related to phase unwrapping issues in general purpose phase vocoders, the harmonic transposer has unambiguously defined phase operations when integer transposition factors T are used. Thus, in preferred embodiments the transposition order T is an integer value. Otherwise, phase unwrapping techniques could be applied, wherein phase unwrapping is a process whereby the phase increment between two consecutive frames is used to estimate the instantaneous frequency of a nearby sinusoid in each channel.

Yet another aspect to consider, when dealing with the transposition of audio and/or voice signals, is the processing of stationary and/or transient signal sections. Typically, in order to be able to transpose stationary audio signals without intermodulation artifacts, the frequency resolution of the DFT filter bank has to be rather high, and therefore the windows are long compared to transients in the input signals x(n), notably audio and/or voice signals. As a result, the transposer has a poor transient response. However, as will be described in the following, this problem can be solved by a modification of the window design, the transform size and the time stride parameters. Hence, unlike many state of the art methods for phase vocoder transient response enhancement, the proposed solution does not rely on any signal adaptive operation such as transient detection.

In the following, the harmonic transposition of transient signals using vocoders is outlined. As a starting point, a prototype transient signal, a discrete time Dirac pulse at time instant $t=t_0$, $$\delta(t - t_0) = \begin{cases} 1, & t = t_0 \\ 0, & t \ne t_0 \end{cases},$$

is considered. The Fourier transform of such a Dirac pulse has unit magnitude and a linear phase with a slope proportional to $t_0$:

$$X(\Omega_m) = \sum_{n=-\infty}^{\infty} \delta(n - t_0)\exp(-j\Omega_m n) = \exp(-j\Omega_m t_0).$$

Such Fourier transform can be considered as the analysis stage of the phase vocoder described above, wherein a flat analysis window $v_a(n)$ of infinite duration is used. In order to generate an output signal y(n) which is time-stretched by a factor T, i.e. a Dirac pulse $\delta(t-Tt_0)$ at the time instant $t=Tt_0$, the phase of the analysis subband signals should be multiplied by the factor T in order to obtain the synthesis subband signal $Y(\Omega_m)=\exp(-j\Omega_m Tt_0)$ which yields the desired Dirac pulse $\delta(t-Tt_0)$ as an output of an inverse Fourier Transform.

This shows that the operation of phase multiplication of the analysis subband signals by a factor T leads to the desired time-shift of a Dirac pulse, i.e. of a transient input signal. It should be noted that for more realistic transient signals comprising more than one non-zero sample, the further operations of time-stretching of the analysis subband signals by a factor T should be performed. In other words, different hop sizes should be used at the analysis and the synthesis side.

However, it should be noted that the above considerations refer to an analysis/synthesis stage using analysis and synthesis windows of infinite lengths. Indeed, a theoretical transposer with a window of infinite duration would give the correct stretch of a Dirac pulse $\delta(t-t_0)$. For a finite duration windowed analysis, the situation is scrambled by the fact that each analysis block is to be interpreted as one period interval of a periodic signal with period equal to the size of the DFT.

This is illustrated in FIG. 1 which shows the analysis and synthesis 100 of a Dirac pulse $\delta(t-t_0)$. The upper part of FIG. 1 shows the input to the analysis stage 110 and the lower part of FIG. 1 shows the output of the synthesis stage 120. The upper and lower graphs represent the time domain. The stylized analysis window 111 and synthesis window 121 are depicted as triangular (Bartlett) windows. The input pulse $\delta(t-t_0)$ 112 at time instant $t=t_0$ is depicted on the top graph 110 as a vertical arrow. It is assumed that the DFT transform block is of size M=L, i.e. the size of the DFT transform is chosen to be equal to the size of the windows. The phase multiplication of the subband signals by the factor T will produce the DFT analysis of a Dirac pulse $\delta(t-Tt_0)$ at $t=Tt_0$, however, periodized to a Dirac pulse train with period L. This is due to the finite length of the applied window and Fourier Transform. The periodized pulse train with period Lis depicted by the dashed arrows 123, 124 on the lower graph.

In a real-world system, where both the analysis and synthesis windows are of finite length, the pulse train actually contains a few pulses only (depending on the transposition factor), one main pulse, i.e. the wanted term, a few pre-pulses and a few post-pulses, i.e. the unwanted terms. The pre- and post-pulses emerge because the DFT is periodic (with L). When a pulse is located within an analysis window, so that the complex phase gets wrapped when multiplied by T (i.e. the pulse is shifted outside the end of the window and wraps back to the beginning), an unwanted pulse emerges. The unwanted pulses may have, or may not have, the same polarity as the input pulse, depending on the location in the analysis window and the transposition factor.

This can be seen mathematically when transforming the Dirac pulse $\delta(t-t_0)$ situated in the interval $-L/2 \le t_0 < L/2$ using a DFT with length L centered around t=0, $$X(\Omega_m) = \sum_{n=-L/2}^{L/2-1} \delta(n - t_0)\exp(-j\Omega_m n) = \exp(-j\Omega_m t_0).$$

The analysis subband signals are phase multiplied with a factor T to obtain the synthesis subband signals $Y(\Omega_m)=\exp(-j\Omega_m Tt_0)$. Then the inverse DFT is applied to obtain the periodic synthesis signal:

$$y(n) = \frac{1}{L}\sum_{n=-L/2}^{L/2-1} \exp(-j\Omega_m Tt_0)\exp(j\Omega_m n) = \sum_{k=-\infty}^{\infty} \delta(n - Tt_0 + kL).$$

i.e. a Dirac pulse train with period L.

In the example of FIG. 1, the synthesis windowing uses a finite window $v_s$ (n) 121. The finite synthesis window 121 picks the desired pulse $\delta(t-Tt_0)$ at $t=Tt_0$ which is depicted as a solid arrow 122 and cancels the other contributions which are shown as dashed arrows 123, 124.

As the analysis and synthesis stage move along the time axis according to the hop factor or time stride $\Delta t$, the pulse $\delta(t-t_0)$ 112 will have another position relative to the center of the respective analysis window 111. As outlined above, the operation to achieve time-stretching consists in moving the pulse 112 to T times its position relative to the center of the window. As long as this position is within the window 121, this time-stretch operation guarantees that all contributions add up to a single time stretched synthesized pulse $\delta(t-Tt_0)$ at $t=Tt_0$.

Figure 2:
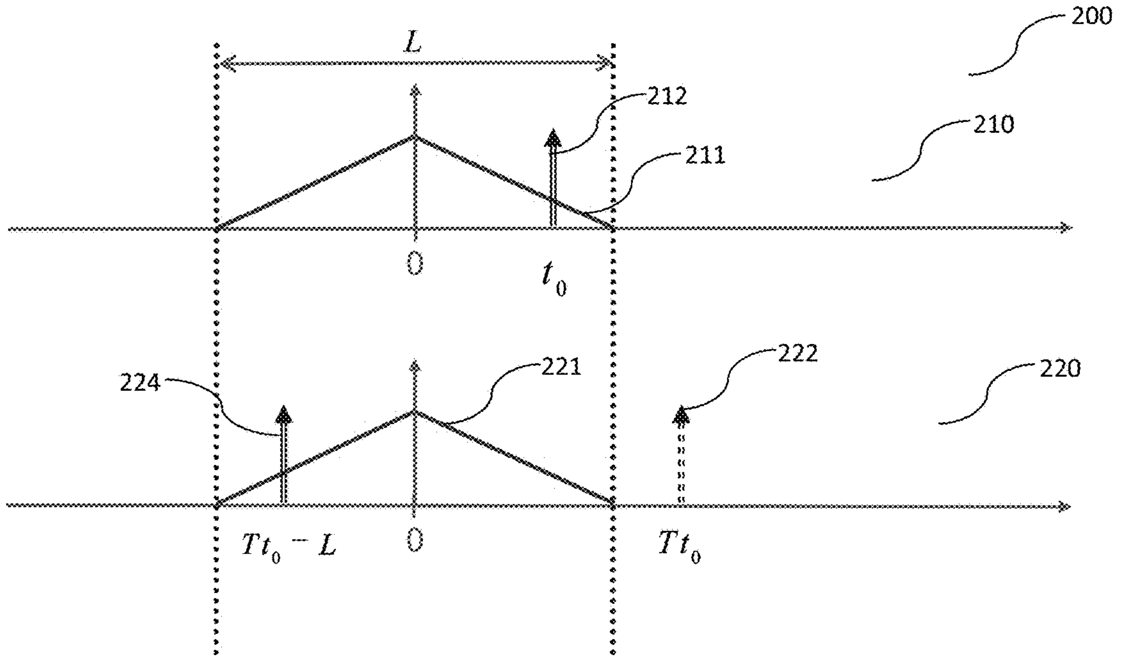
FIG. 2 illustrates a Dirac at a different position as it appears in the analysis and synthesis windows of a harmonic transposer.

However, a problem occurs for the situation of FIG. 2, where the pulse $\delta(t-t_0)$ 212 moves further out towards the edge of the DFT block. FIG. 2 illustrates a similar analysis/synthesis configuration 200 as FIG. 1. The upper graph 210 shows the input to the analysis stage and the analysis window 211, and the lower graph 220 illustrates the output of the synthesis stage and the synthesis window 221. When time-stretching the input Dirac pulse 212 by a factor T, the time stretched Dirac pulse 222, i.e. $\delta(t-Tt_0)$, is outside the synthesis window 221. At the same time, another Dirac pulse 224 of the pulse train, i.e. $\delta(t-Tt_0+L)$ at time instant $t=Tt_0-L$, is picked up by the synthesis window. In other words, the input Dirac pulse 212 is not delayed to a T times later time instant, but it is moved forward to a time instant that lies before the input Dirac pulse 212. The final effect on the audio signal is the occurrence of a pre-echo at a time distance of the scale of the rather long transposer windows, i.e. at a time instant $t=Tt_0-L$ which is $L-(T-1)t_0$ earlier than the input Dirac pulse 212.

Figure 3:
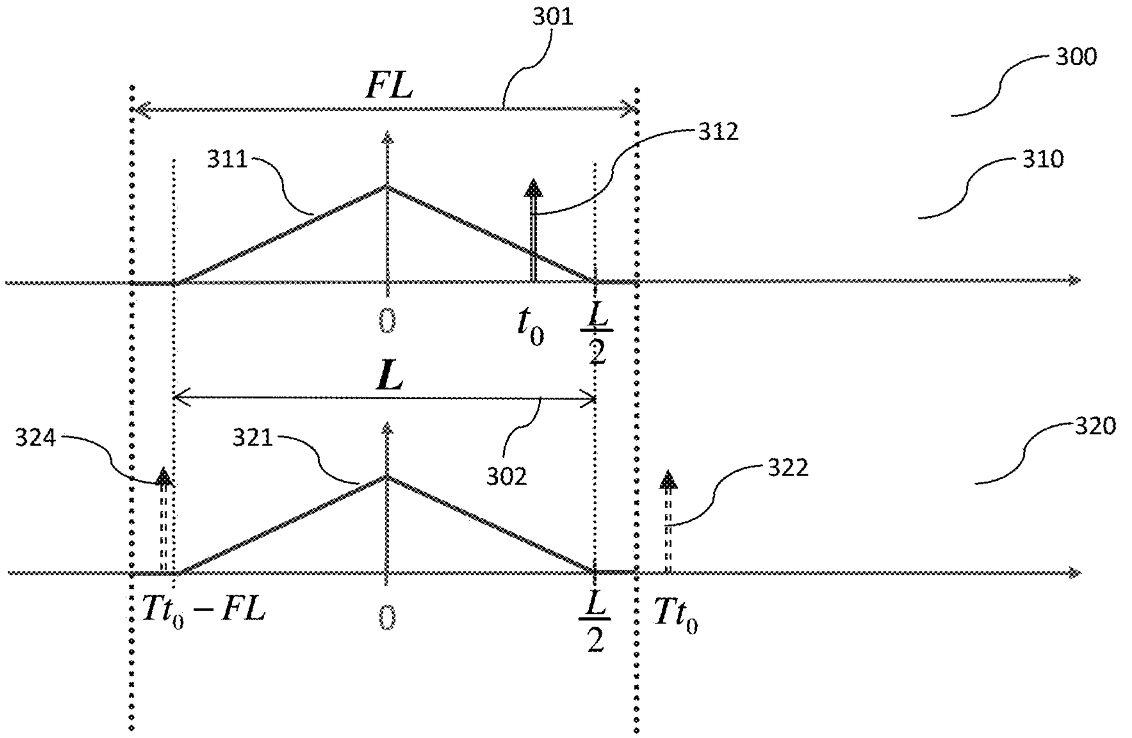
FIG. 3 illustrates a Dirac for the position of FIG. 2 as it will appear according to the present invention.

The principle of the solution proposed by the present invention is described in reference to FIG. 3. FIG. 3 illustrates an analysis/synthesis scenario 300 similar to FIG. 2. The upper graph 310 shows the input to the analysis stage with the analysis window 311, and the lower graph 320 shows the output of the synthesis stage with the synthesis window 321. The basic idea of the invention is to adapt the DFT size so as to avoid pre-echoes. This may be achieved by setting the size M of the DFT such that no unwanted Dirac pulse images from the resulting pulse train are picked up by the synthesis window. The size of the DFT transform 301 is increased to M=FL, where Lis the length of the window function 302 and the factor F is a frequency domain oversampling factor. In other words, the size of the DFT transform 301 is selected to be larger than the window size 302. In particular, the size of the DFT transform 301 may be selected to be larger than the window size 302 of the synthesis window. Due to the increased length 301 of the DFT transform, the period of the pulse train comprising the Dirac pulses 322, 324 is FL. By selecting a sufficiently large value of F, i.e. by selecting a sufficiently large frequency domain oversampling factor, undesired contributions to the pulse stretch can be cancelled. This is shown in FIG. 3, where the Dirac pulse 324 at time instant $t=Tt_0-FL$ lies outside the synthesis window 321. Therefore, the Dirac pulse 324 is not picked up by the synthesis window 321 and by consequence, pre-echoes can be avoided.

It should be noted that in a preferred embodiment the synthesis window and the analysis window have equal "nominal" lengths. However, when using implicit resampling of the output signal by discarding or inserting samples in the frequency bands of the transform or filter bank, the synthesis window size will typically be different from the analysis size, depending on the resampling or transposition factor.

The minimum value of F, i.e. the minimum frequency domain oversampling factor, can be deduced from FIG. 3. The condition for not picking up undesired Dirac pulse images may be formulated as follows: For any input pulse $\delta(t-t_0)$ at position $$t = t_0 < \frac{L}{2},$$

i.e. for any input pulse comprised within the analysis window 311, the undesired image $\delta(t-Tt_0+FL)$ at time instant $t=Tt_0-FL$ must be located to the left of the left edge of the synthesis window at $$t = -\frac{L}{2}.$$

Equivalently, the condition $$T\frac{L}{2} - FL \leq -\frac{L}{2}$$

must be met, which leads to the rule $$F \geq \frac{T+1}{2}. \quad (3)$$

As can be seen from formula (3), the minimum frequency domain oversampling factor F is a function of the transposition/time-stretching factor T. More specifically, the minimum frequency domain oversampling factor F is proportional to the transposition/time-stretching factor T.

By repeating the line of thinking above for the case where the analysis and synthesis windows have different lengths one obtains a more general formula. Let $L_A$ and $L_s$ be the lengths of the analysis and synthesis windows, respectively, and let M be the DFT size employed. The rule extending formula (3) is then $$M \geq \frac{TL_A + L_S}{2}. \quad (4)$$

That this rule indeed is an extension of (3) can be verified by inserting M=FL, and $L_A=L_s=L$ in (4) and dividing by L on both side of the resulting equation.

The above analysis is performed for a rather special model of a transient, i.e. a Dirac pulse. However, the reasoning can be extended to show that when using the above described time-stretching scheme, input signals which have a near flat spectral envelope and which vanish outside a time interval [a,b] will be stretched to output signals which are small outside the interval [Ta, Tb]. It can also be checked by studying spectrograms of real audio and/or speech signals that pre-echoes disappear in the stretched signals when the above described rule for selecting an appropriate frequency domain oversampling factor is respected. A more quantitative analysis also reveals that pre-echoes are still reduced when using frequency domain oversampling factors which are slightly inferior to the value imposed by the condition of formula (3). This is due to the fact that typical window functions $v_s(n)$ are small near their edges, thereby attenuating undesired pre-echoes which are positioned near the edges of the window functions.

In summary, the present invention teaches a new way to improve the transient response of frequency domain harmonic transposers, or time-stretchers, by introducing an oversampled transform, where the amount of oversampling is a function of the transposition factor chosen.

In the following, the application of harmonic transposition according to the invention in audio decoders is described in further detail. A common use case for a harmonic transposer is in an audio/speech codec system employing so-called bandwidth extension or high frequency regeneration (HFR). It should be noted that even though reference may be made to audio coding, the described methods and systems are equally applicable to speech coding and in unified speech and audio coding (USAC).

In such HFR systems the transposer may be used to generate a high frequency signal component from a low frequency signal component provided by the so-called core decoder. The envelope of the high frequency component may be shaped in time and frequency based on side information conveyed in the bit-stream.

Figure 4:
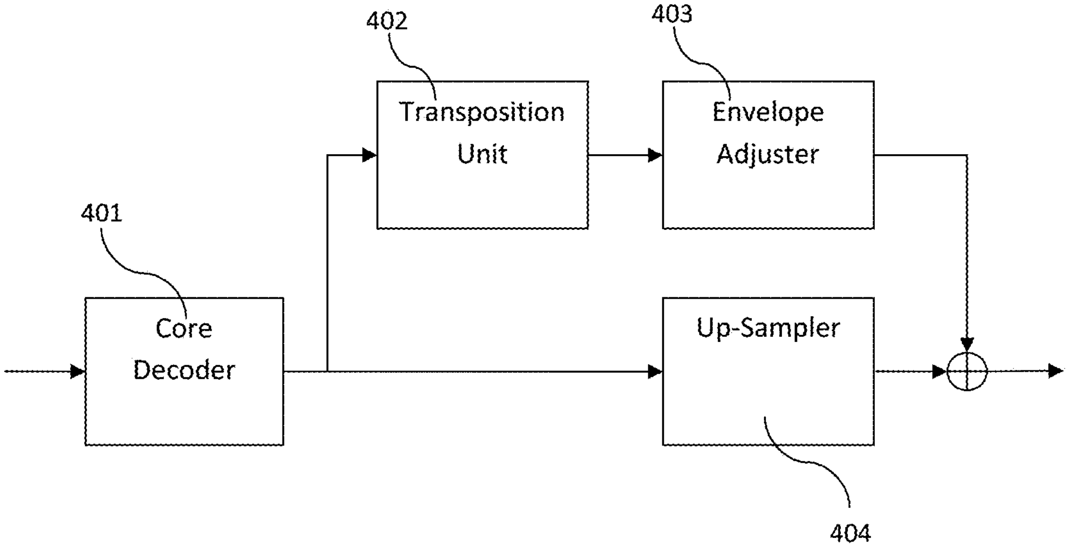
FIG. 4 illustrates the operation of an HFR enhanced audio decoder.

FIG. 4 illustrates the operation of an HFR enhanced audio decoder. The core audio decoder 401 outputs a low bandwidth audio signal which is fed to an up-sampler 404 which may be required in order to produce a final audio output contribution at the desired full sampling rate. Such up-sampling is required for dual rate systems, where the band limited core audio codec is operating at half the external audio sampling rate, while the HFR part is processed at the full sampling frequency. Consequently, for a single rate system, this up-sampler 404 is omitted. The low bandwidth output of 401 is also sent to the transposer or the transposition unit 402 which outputs a transposed signal, i.e. a signal comprising the desired high frequency range. This transposed signal may be shaped in time and frequency by the envelope adjuster 403. The final audio output is the sum of low bandwidth core signal and the envelope adjusted transposed signal.

As outlined in the context of FIG. 4, the core decoder output signal may be up-sampled as a pre-processing step by a factor 2 in the transposition unit 402. A transposition by a factor T results in a signal having T times the length of the un-transposed signal, in case of time-stretching. In order to achieve the desired pitch-shifting or frequency transposition to T times higher frequencies, down-sampling or rate-conversion of the time-stretched signal is subsequently performed. As mentioned above, this operation may be achieved through the use of different analysis and synthesis strides in the phase vocoder.

The overall transposition order may be obtained in different ways. A first possibility is to up-sample the decoder output signal by the factor 2 at the entrance to the transposer as pointed out above. In such cases, the time-stretched signal would need to be down-sampled by a factor T, in order to obtain the desired output signal which is frequency transposed by a factor T. A second possibility would be to omit the pre-processing step and to directly perform the time-stretching operations on the core decoder output signal. In such cases, the transposed signals must be down-sampled by a factor T/2 to retain the global up-sampling factor of 2 and in order to achieve frequency transposition by a factor T. In other words, the up-sampling of the core decoder signal may be omitted when performing a down-sampling of the output signal of the transposer 402 of T/2 instead of T. It should be noted, however, that the core signal still needs to be up-sampled in the up-sampler 404 prior to combining the signal with the transposed signal.

Figure 5:
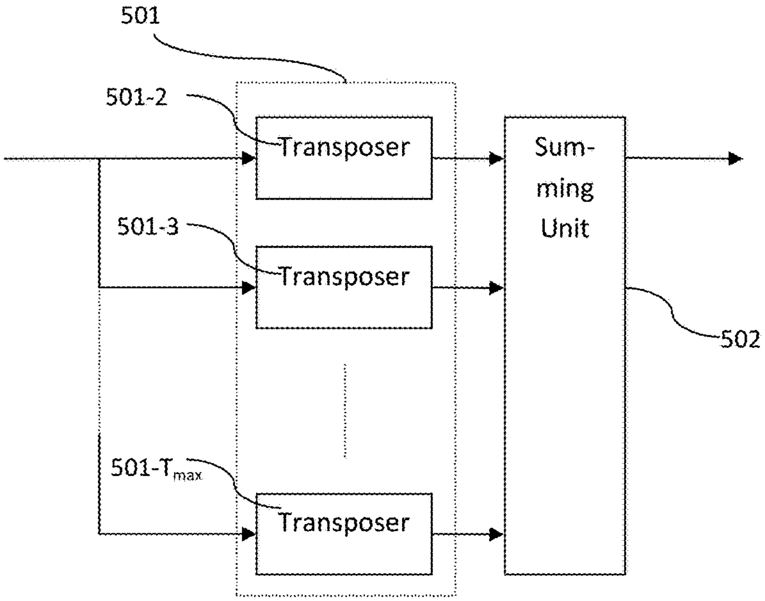
FIG. 5 illustrates the operation of a harmonic transposer using several orders.

It should also be noted that the transposer 402 may use several different integer transposition factors in order to generate the high frequency component. This is shown in FIG. 5 which illustrates the operation of a harmonic transposer 501, which corresponds to the transposer 402 of FIG. 4, comprising several transposers of different transposition order or transposition factor T. The signal to be transposed is passed to the bank of individual transposers 501-2, 501-3, . . . , 501-$T_{max}$ having orders of transposition T=2, 3, . . . , $T_{max}$, respectively. Typically a transposition order $T_{max}$=4 suffices for most audio coding applications. The contributions of the different transposers 501-2, 501-3, . . . , 501-$T_{max}$ are summed in 502 to yield the combined transposer output. In a first embodiment, this summing operation may comprise the adding up of the individual contributions. In another embodiment, the contributions are weighted with different weights, such that the effect of adding multiple contributions to certain frequencies is mitigated. For instance, the third order contribution may be added with a lower gain than the second order contribution. Finally, the summing unit 502 may add the contributions selectively depending on the output frequency. For instance, the second order transposition may be used for a first lower target frequency range, and the third order transposition may be used for a second higher target frequency range.

Figure 6:
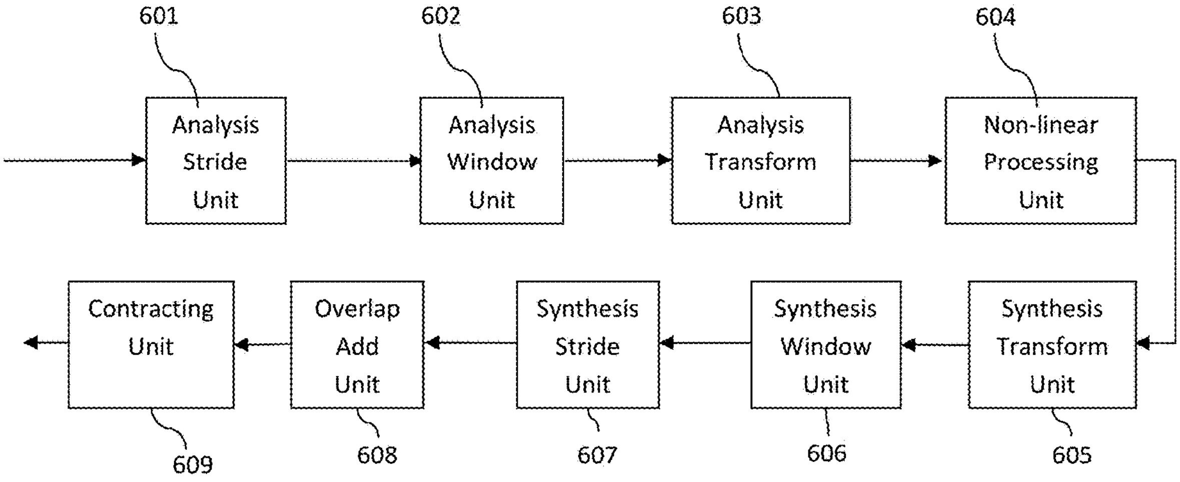
FIG. 6 illustrates the operation of a frequency domain (FD) harmonic transposer.

FIG. 6 illustrates the operation of a harmonic transposer, such as one of the individual blocks of 501, i.e. one of the transposers 501-T of transposition order T. An analysis stride unit 601 selects successive frames of the input signal which is to be transposed. These frames are super-imposed, e.g. multiplied, in an analysis window unit 602 with an analysis window. It should be noted that the operations of selecting frames of an input signal and multiplying the samples of the input signal with an analysis window function may be performed in a unique step, e.g. by using a window function which is shifted along the input signal by the analysis stride. In the analysis transformation unit 603, the windowed frames of the input signal are transformed into the frequency domain. The analysis transformation unit 603 may e.g. perform a DFT. The size of the DFT is selected to be F times greater than the size L of the analysis window, thereby generating M=F*L complex frequency domain coefficients. These complex coefficients are altered in the non-linear processing unit 604, e.g. by multiplying their phase with the transposition factor T. The sequence of complex frequency domain coefficients, i.e. the complex coefficients of the sequence of frames of the input signal, may be viewed as subband signals. The combination of analysis stride unit 601, analysis window unit 602 and analysis transformation unit 603 may be viewed as a combined analysis stage or analysis filter bank.

The altered coefficients or altered subband signals are retransformed into the time domain using the synthesis transformation unit 605. For each set of altered complex coefficients, this yields a frame of altered samples, i.e. a set of M altered samples. Using the synthesis window unit 606, L samples may be extracted from each set of altered samples, thereby yielding a frame of the output signal. Overall, a sequence of frames of the output signal may be generated for the sequence of frames of the input signal. This sequence of frames is shifted with respect to one another by the synthesis stride in the synthesis stride unit 607. The synthesis stride may be T times greater than the analysis stride. The output signal is generated in the overlap-add unit 608, where the shifted frames of the output signal are overlapped and samples at the same time instant are added. By traversing the above system, the input signal may be time-stretched by a factor T, i.e. the output signal may be a time-stretched version of the input signal.

Finally, the output signal may be contracted in time using the contracting unit 609. The contracting unit 609 may perform a sampling rate conversion of order T, i.e. it may increase the sampling rate of the output signal by a factor T, while keeping the number of samples unchanged. This yields a transposed output signal, having the same length in time as the input signal but comprising frequency components which are up-shifted by a factor T with respect to the input signal. The combining unit 609 may also perform a down-sampling operation by a factor T, i.e. it may retain only every $T^{th}$ sample while discarding the other samples. This down-sampling operation may also be accompanied by a low pass filter operation. If the overall sampling rate remains unchanged, then the transposed output signal comprises frequency components which are up-shifted by a factor T with respect to the frequency components of the input signal.

It should be noted that the contracting unit 609 may perform a combination of rate-conversion and down-sampling. By way of example, the sampling rate may be increased by a factor 2. At the same time the signal may be down-sampled by a factor T/2. Overall, such combination of rate-conversion and down-sampling also leads to an output signal which is a harmonic transposition of the input signal by a factor T. In general, it may be stated that the contracting unit 609 performs a combination of rate conversion and/or down-sampling in order to yield a harmonic transposition by the transposition order T. This is particularly useful when performing harmonic transposition of the low bandwidth output of the core audio decoder 401. As outlined above, such low bandwidth output may have been down-sampled by a factor 2 at the encoder and may therefore require up-sampling in the up-sampling unit 404 prior to merging it with the reconstructed high frequency component. Nevertheless, it may be beneficial for reducing computation complexity to perform harmonic transposition in the transposition unit 402 using the "non-up-sampled" low bandwidth output. In such cases, the contracting unit 609 of the transposition unit 402 may perform a rate-conversion of order 2 and thereby implicitly perform the required up-sampling operation of the high frequency component. By consequence, transposed output signals of order T are down-sampled in the contracting unit 609 by the factor T/2.

In the case of multiple parallel transposers of different transposition orders such as shown in FIG. 5, some transformation or filter bank operations may be shared between different transposers 501-2, 501-3, . . . , 501-$T_{max}$. The sharing of filter bank operations may be done preferably for the analysis in order to obtain more effective implementations of transposition units 402. It should be noted that a preferred way to resample the outputs from different transposers is to discard DFT-bins or subband channels before the synthesis stage. This way, resampling filters may be omitted and complexity may be reduced when performing an inverse DFT/synthesis filter bank of smaller size.

Figure 7:
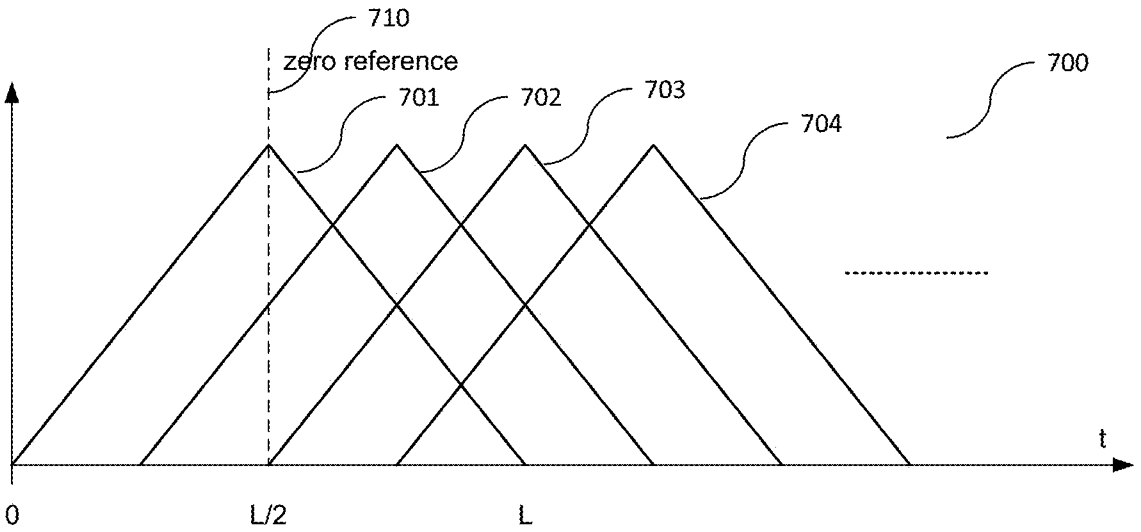
FIG. 7 shows a succession of analysis synthesis windows.

As just mentioned, the analysis window may be common to the signals of different transposition factors. When using a common analysis window, an example of the stride of windows 700 applied to the low band signal is depicted in FIG. 7. FIG. 7 shows a stride of analysis windows 701, 702, 703 and 704, which are displaced with respect to one another by the analysis hop factor or analysis time stride $\Delta t_a$.

Figure 8:
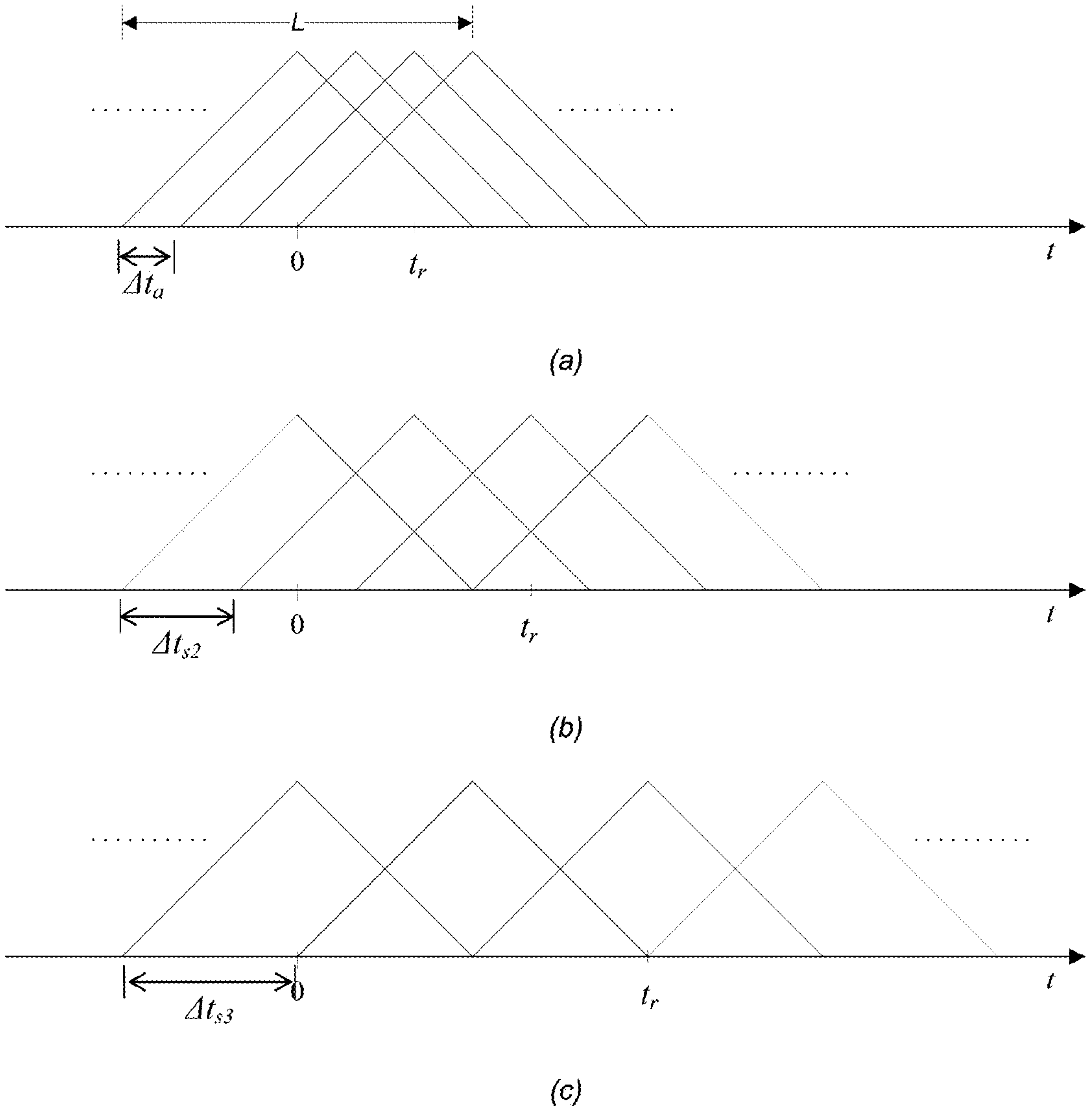
FIG. 8 illustrates analysis and synthesis windows at different strides.

An example of the stride of windows applied to the low band signal, e.g. the output signal of the core decoder, is depicted in FIG. 8(*a*). The stride with which the analysis window of length L is moved for each analysis transform is denoted $\Delta t_a$. Each such analysis transform and the windowed portion of the input signal is also referred to as a frame. The analysis transform converts/transforms the frame of input samples into a set of complex FFT coefficient. After the analysis transform, the complex FFT coefficients may be transformed from Cartesian to polar coordinates. The suite of FFT coefficients for subsequent frames makes up the analysis subband signals. For each of the transposition factors T=2, 3, . . . , $T_{max}$ used, the phase angles of the FFT coefficients are multiplied by the respective transposition factor T and transformed back to Cartesian coordinates. Hence, there will be a different set of complex FFT coefficients representing a particular frame for every transposition factor T. In other words, for each of the transposition factors T=2, 3, . . . , $T_{max}$ and for each frame, a separate set of FFT coefficients is determined. By consequence, for every transposition order T a different set of synthesis subband signals $$Y(t_s^k, \Omega_m)$$

is generated.

In the synthesis stages, the synthesis strides $\Delta t_s$ of the synthesis windows are determined as a function of the transposition order T used in the respective transposer. As outlined above, the time-stretch operation also involves time stretching of the subband signals, i.e. time stretching of the suite of frames. This operation may be performed by choosing a synthesis hop factor or synthesis stride $\Delta t_s$ which is increased over the analysis stride $\Delta t_a$ by a factor T. Consequently, the synthesis stride $\Delta t_{sT}$ for the transposer of order T is given by $\Delta t_{sT}=T\Delta t_a$. FIGS. 8(*b*) and 8(*c*) show the synthesis stride $\Delta t_{sT}$ of synthesis windows for the transposition factors T=2 and T=3, respectively, where $\Delta t_{s2}=2\Delta t_a$, and $\Delta t_{s3}=3\Delta t_a$.

Figure 9:
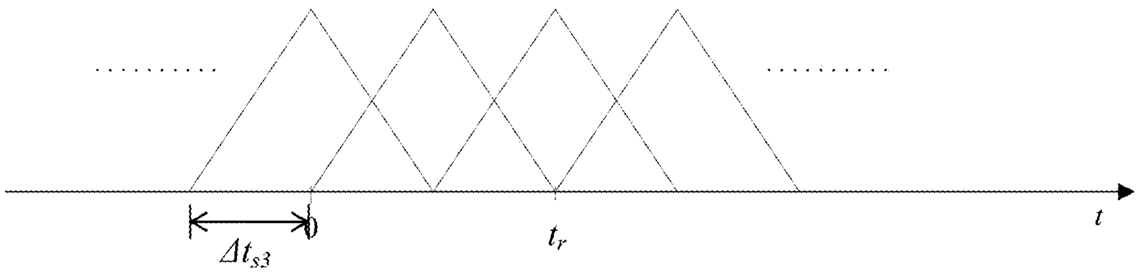
FIG. 9 illustrates the effect of the re-sampling on the synthesis stride of windows.

FIG. 8 also indicates the reference time $t_r$ which has been "stretched" by a factor T=2 and T=3 in FIGS. 8(*b*) and 8(*c*) compared to FIG. 8(*a*), respectively. However, at the outputs this reference time $t_r$ needs to be aligned for the two transposition factors. To align the output, the third order transposed signal, i.e. FIG. 8(*c*), needs to be down-sampled or rate-converted with the factor 3/2. This down-sampling leads to a harmonic transposition in respect to the second order transposed signal. FIG. 9 illustrates the effect of the re-sampling on the synthesis stride of windows for T=3. If it is assumed that the analysed signal is the output signal of a core decoder which has not been up-sampled, then the signal of FIG. 8(*b*) has been effectively frequency transposed by a factor 2 and the signal of FIG. 8(*c*) has been effectively frequency transposed by a factor 3.

In the following, the aspect of time alignment of transposed sequences of different transposition factors when using common analysis windows is addressed. In other words, the aspect of aligning the output signals of frequency transposers employing a different transposition order is addressed. When using the methods outlined above, Dirac-functions $\delta(t-t_0)$ are time-stretched, i.e. moved along the time axis, by the amount of time given by the applied transposition factor T. In order to convert the time-stretching operation into a frequency shifting operation, a decimation or down-sampling using the same transposition factor T is performed. If such decimation by the transposition factor or transposition order T is performed on the time-stretched Dirac-function $\delta(t-Tt_0)$, the down-sampled Dirac pulse will be time aligned with respect to the zero-reference time 710 in the middle of the first analysis window 701. This is illustrated in FIG. 7.

However, when using different orders of transposition T, the decimations will result in different offsets for the zero-reference, unless the zero-reference is aligned with "zero" time of the input signal. By consequence, a time offset adjustment of the decimated transposed signals need to be performed, before they can be summed up in the summing unit 502. As an example, a first transposer of order T=3 and a second transposer of order T=4 are assumed. Furthermore, it is assumed that the output signal of the core decoder is not up-sampled. Then the transposer decimates the third order time-stretched signal by a factor 3/2, and the fourth order time-stretched signal by a factor 2. The second order time-stretched signal, i.e. T=2, will just be interpreted as having a higher sampling frequency compared to the input signal, i.e. a factor 2 higher sampling frequency, effectively making the output signal pitch-shifted by a factor 2.

It can be shown that in order to align the transposed and down-sampled signals, time offsets by $$\frac{(T-2)L}{4}$$

need to be applied to the transposed signals before decimation, i.e. for the third and fourth order transpositions, offsets of $$\frac{L}{4} \text{ and } \frac{L}{2}$$

have to be applied respectively. To verify this in a concrete example, the zero-reference for a second order time-stretched signal will be assumed to correspond to time instant or sample $$\frac{L}{2},$$

i.e. to the zero-reference 710 in FIG. 7. This is so, because no decimation is used. For a third order time-stretched signal, the reference will translate to $$\frac{L}{2}\left(\frac{2}{3}\right)=\frac{L}{3},$$

due to down-sampling by a factor of $$\frac{3}{2}.$$

If the time offset according to the above mentioned rule is added before decimation, the reference will translate into $$\left(\frac{L}{2}+\frac{L}{4}\right)\left(\frac{2}{3}\right)=\frac{L}{2}.$$

This means that the reference of the down-sampled transposed signal is aligned with the zero-reference 710. In a similar manner, for the fourth order transposition without offset the zero-reference corresponds to $$\frac{L}{2}\left(\frac{1}{2}\right)=\frac{L}{4},$$

but when using the proposed offset, the reference translates into $$\left(\frac{L}{2}+\frac{L}{2}\right)\left(\frac{1}{2}\right)=\frac{L}{2},$$

which again is aligned with the $2^{nd}$ order zero-reference 710, i.e. the zero-reference for the transposed signal using T=2.

Another aspect to be considered when simultaneously using multiple orders of transposition relates to the gains applied to the transposed sequences of different transposition factors. In other words, the aspect of combining the output signals of transposers of different transposition order may be addressed. There are two principles when selecting the gain of the transposed signals, which may be considered under different theoretical approaches. Either, the transposed signals are supposed to be energy conserving, meaning that the total energy in the low band signal which subsequently is transposed to constitute a factor-T transposed high band signal is preserved. In this case the energy per bandwidth should be reduced by the transposition factor T since the signal is stretched by the same amount T in frequency. However, sinusoids, which have their energy within an infinitesimally small bandwidth, will retain their energy after transposition. This is due to the fact that in the same way as a Dirac pulse is moved in time by the transposer when time-stretching, i.e. in the same way that the duration in time of the pulse is not changed by the time-stretching operation, a sinusoidal is moved in frequency when transposing, i.e. the duration in frequency (in other words the bandwidth) is not changed by the frequency transposing operation. I.e. even though the energy per bandwidth is reduced by T, the sinusoidal has all its energy in one point in frequency so that the point-wise energy will be preserved.

The other option when selecting the gain of the transposed signals is to keep the energy per bandwidth after transposition. In this case, broadband white noise and transients will display a flat frequency response after transposition, while the energy of sinusoids will increase by a factor T.

A further aspect of the invention is the choice of analysis and synthesis phase vocoder windows when using common analysis windows. It is beneficial to carefully choose the analysis and synthesis phase vocoder windows, i.e. $v_a(n)$ and $v_s(n)$. Not only should the synthesis window $v_s(n)$ adhere to Formula 2 above, in order to allow for perfect reconstruction. Furthermore, the analysis window $v_a(n)$ should also have adequate rejection of the side lobe levels. Otherwise, unwanted “aliasing” terms will typically be audible as interference with the main terms for frequency varying sinusoids. Such unwanted “aliasing” terms may also appear for stationary sinusoids in the case of even transposition factors as mentioned above. The present invention proposes the use of sine windows because of their good side lobe rejection ratio. Hence, the analysis window is proposed to be $$v_a(n)=\sin\left(\frac{\pi}{L}(n+0.5)\right),\ 0\le n<L \tag{4}$$

The synthesis windows $v_s(n)$ will be either identical to the analysis window $v_a(n)$ or given by formula (2) above if the synthesis hop-size $\Delta t_s$ is not a factor of the analysis window length L, i.e. if the analysis window length L is not integer dividable by the synthesis hop-size. By way of example, if L=1024, and $\Delta t_s$=384, then 1024/384=2.667 is not an integer. It should be noted that it is also possible to select a pair of bi-orthogonal analysis and synthesis windows as outlined above. This may be beneficial for the reduction of aliasing in the output signal, notably when using even transposition orders T.

In the following, reference is made to FIG. 10 and FIG. 11 which illustrate an exemplary encoder 1000 and an exemplary decoder 1100, respectively, for unified speech and audio coding (USAC). The general structure of the USAC encoder 1000 and decoder 1100 is described as follows: First there may be a common pre/postprocessing consisting of an MPEG Surround (MPEGS) functional unit to handle stereo or multi-channel processing and an enhanced Spectral Band Replication (eSBR) unit 1001 and 1101, respectively, which handles the parametric representation of the higher audio frequencies in the input signal and which may make use of the harmonic transposition methods outlined in the present document. Then there are two branches, one consisting of a modified Advanced Audio Coding (AAC) tool path and the other consisting of a linear prediction coding (LP or LPC domain) based path, which in turn features either a frequency domain representation or a time domain representation of the LPC residual. All transmitted spectra for both, AAC and LPC, may be represented in MDCT domain followed by quantization and arithmetic coding. The time domain representation may use an ACELP excitation coding scheme.

The enhanced Spectral Band Replication (eSBR) unit 1001 of the encoder 1000 may comprise high frequency reconstruction components outlined in the present document. In some embodiments, the eSBR unit 1001 may comprise a transposition unit outlined in the context of FIGS. 4, 5 and 6. Encoded data related to harmonic transposition, e.g. the order of transposition used, the amount of frequency domain oversampling needed, or the gains employed, may be derived in the encoder 1000 and merged with the other encoded information in a bitstream multiplexer and forwarded as an encoded audio stream to a corresponding decoder 1100.

Figure 11:
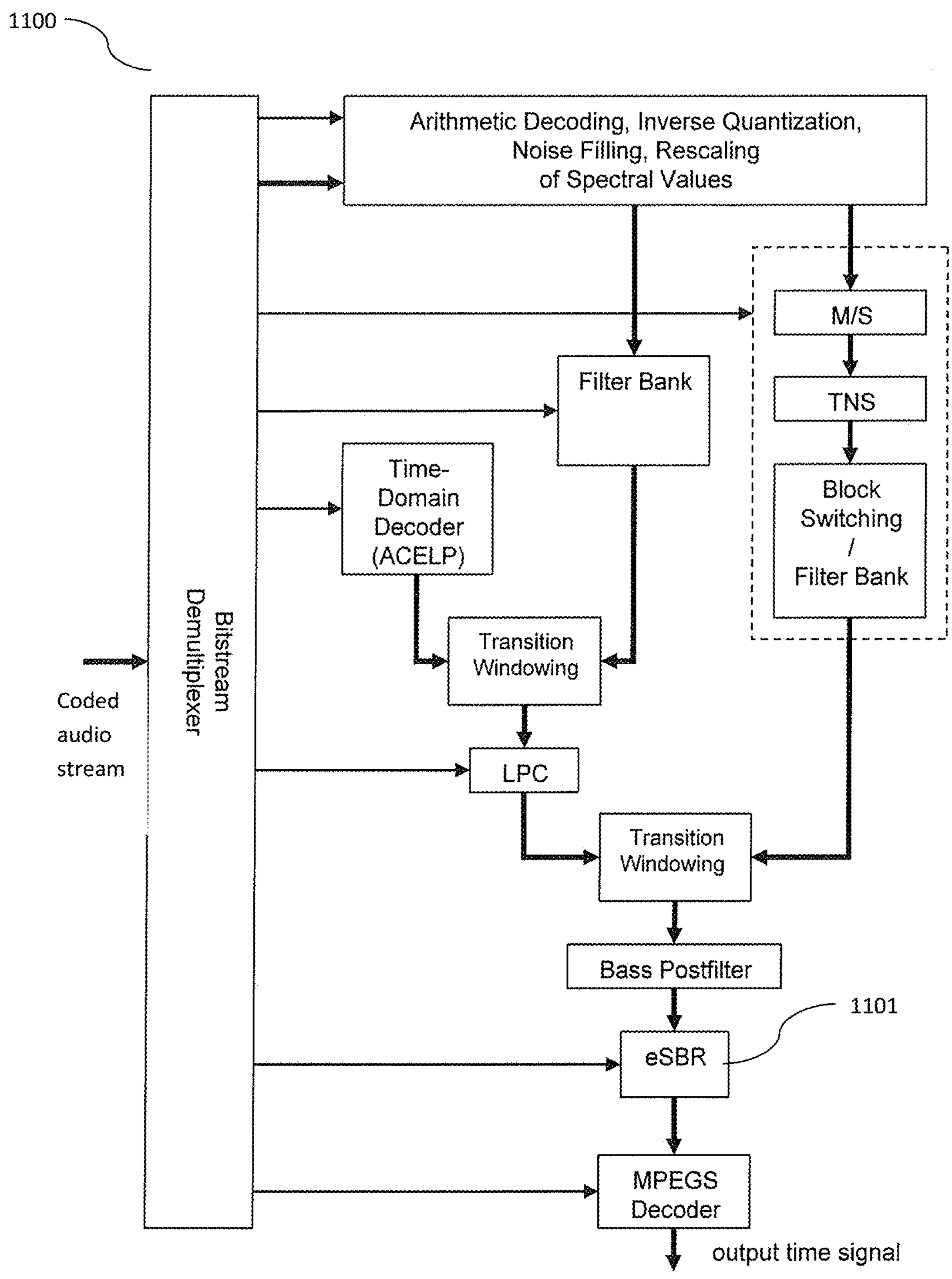

The decoder 1100 shown in FIG. 11 also comprises an enhanced Spectral Bandwidth Replication (eSBR) unit 1101. This eSBR unit 1101 receives the encoded audio bitstream or the encoded signal from the encoder 1000 and uses the methods outlined in the present document to generate a high frequency component or high band of the signal, which is merged with the decoded low frequency component or low band to yield a decoded signal. The eSBR unit 1101 may comprise the different components outlined in the present document. In particular, it may comprise the transposition unit outlined in the context of FIGS. 4, 5 and 6. The eSBR unit 1101 may use information on the high frequency component provided by the encoder 1000 via the bitstream in order to perform the high frequency reconstruction. Such information may be the spectral envelope of the original high frequency component to generate the synthesis subband signals and ultimately the high frequency component of the decoded signal, as well as the order of transposition used, the amount of frequency domain oversampling needed, or the gains employed.

Figure 10:
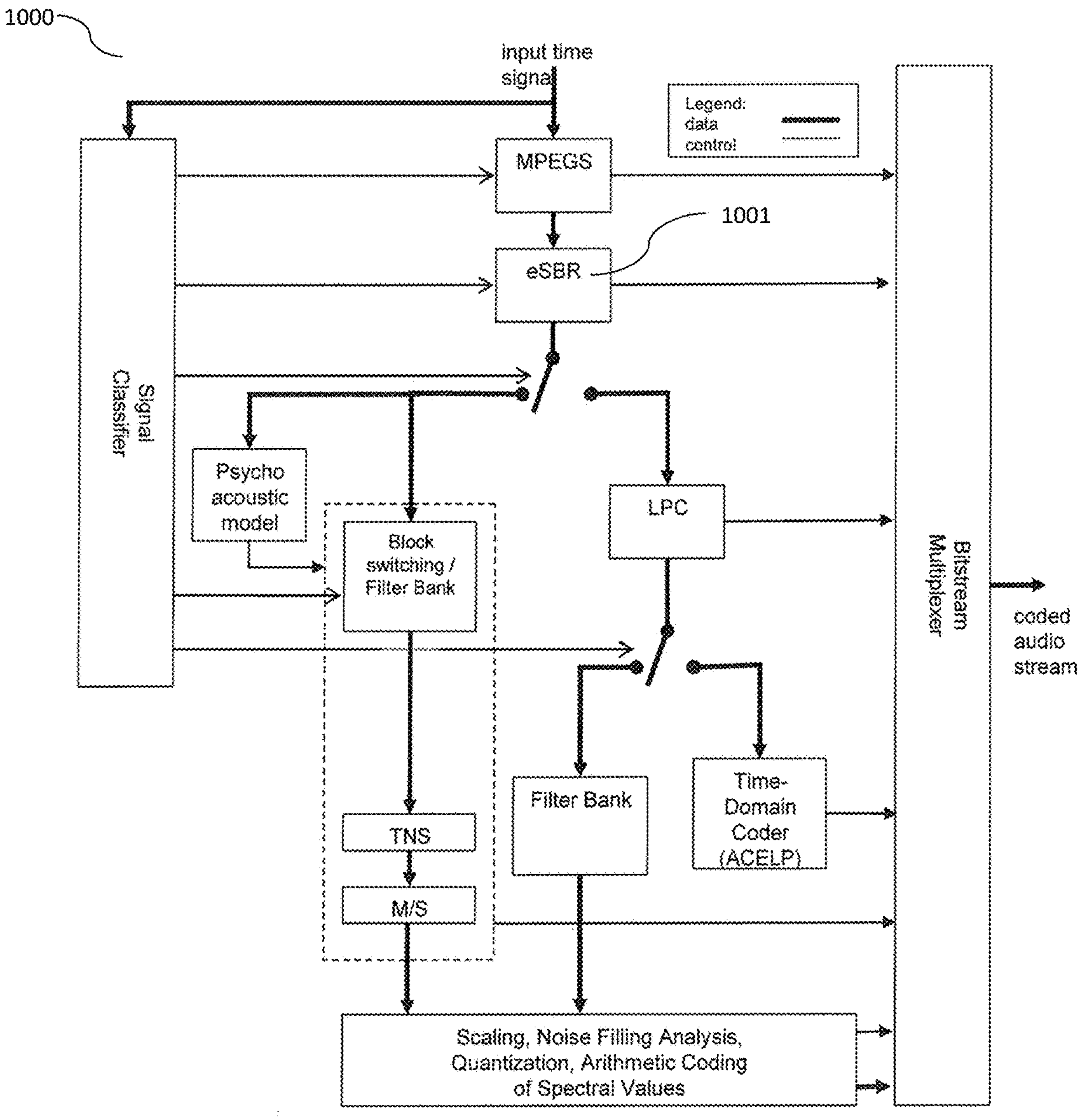
FIGS. 10 and 11 illustrate embodiments of an encoder and a decoder, respectively, using the enhanced harmonic transposition schemes outlined in the present document.

Furthermore, FIGS. 10 and 11 illustrate possible additional components of a USAC encoder/decoder, such as:

- a bitstream payload demultiplexer tool, which separates the bitstream payload into the parts for each tool, and provides each of the tools with the bitstream payload information related to that tool;
- a scalefactor noiseless decoding tool, which takes information from the bitstream payload demultiplexer, parses that information, and decodes the Huffman and DPCM coded scalefactors;
- a spectral noiseless decoding tool, which takes information from the bitstream payload demultiplexer, parses that information, decodes the arithmetically coded data, and reconstructs the quantized spectra;
- an inverse quantizer tool, which takes the quantized values for the spectra, and converts the integer values to the non-scaled, reconstructed spectra; this quantizer is preferably a companding quantizer, whose companding factor depends on the chosen core coding mode;
- a noise filling tool, which is used to fill spectral gaps in the decoded spectra, which occur when spectral values are quantized to zero e.g. due to a strong restriction on bit demand in the encoder;
- a rescaling tool, which converts the integer representation of the scalefactors to the actual values, and multiplies the un-scaled inversely quantized spectra by the relevant scalefactors;
- a M/S tool, as described in ISO/IEC 14496-3;
- a temporal noise shaping (TNS) tool, as described in ISO/IEC 14496-3;
- a filter bank/block switching tool, which applies the inverse of the frequency mapping that was carried out in the encoder; an inverse modified discrete cosine transform (IMDCT) is preferably used for the filter bank tool;
- a time-warped filter bank/block switching tool, which replaces the normal filter bank/block switching tool when the time warping mode is enabled; the filter bank preferably is the same (IMDCT) as for the normal filter bank, additionally the windowed time domain samples are mapped from the warped time domain to the linear time domain by time-varying resampling;
- an MPEG Surround (MPEGS) tool, which produces multiple signals from one or more input signals by applying a sophisticated upmix procedure to the input signal(s) controlled by appropriate spatial parameters; in the USAC context, MPEGS is preferably used for coding a multichannel signal, by transmitting parametric side information alongside a transmitted downmixed signal;
- a signal classifier tool, which analyses the original input signal and generates from it control information which triggers the selection of the different coding modes; the analysis of the input signal is typically implementation dependent and will try to choose the optimal core coding mode for a given input signal frame; the output of the signal classifier may optionally also be used to influence the behaviour of other tools, for example MPEG Surround, enhanced SBR, time-warped filterbank and others;
- an LPC filter tool, which produces a time domain signal from an excitation domain signal by filtering the reconstructed excitation signal through a linear prediction synthesis filter; and
- an ACELP tool, which provides a way to efficiently represent a time domain excitation signal by combining a long term predictor (adaptive codeword) with a pulse-like sequence (innovation codeword).

Figure 12:
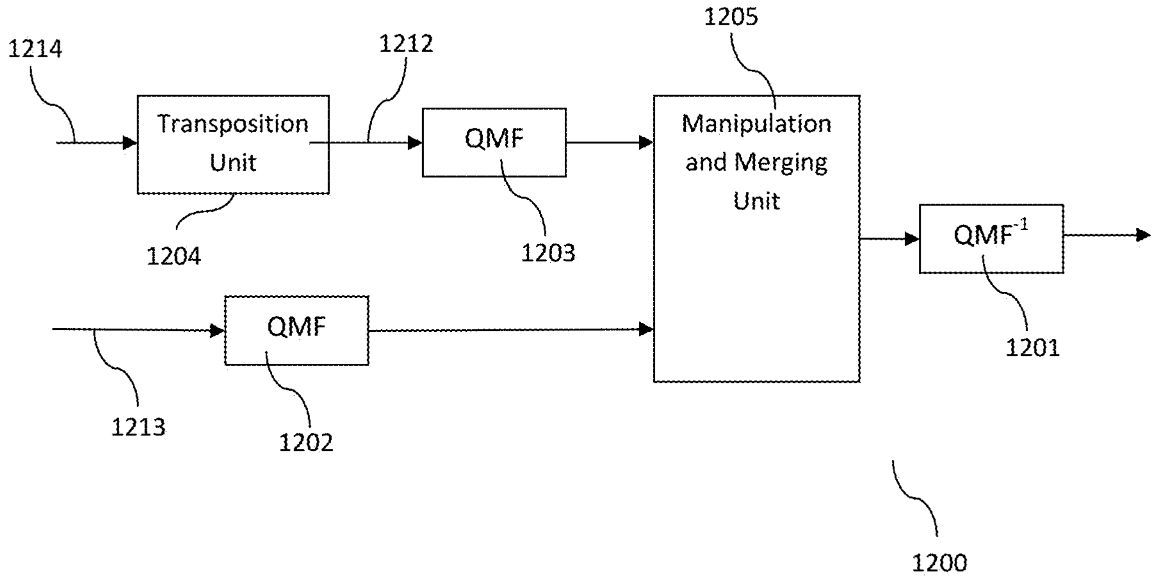
FIG. 12 illustrates an embodiment of a transposition unit shown in FIGS. 10 and 11.

FIG. 12 illustrates an embodiment of the eSBR units shown in FIGS. 10 and 11. The eSBR unit 1200 will be described in the following in the context of a decoder, where the input to the eSBR unit 1200 is the low frequency component, also known as the low band, of a signal.

In FIG. 12 the low frequency component 1213 is fed into a QMF filter bank, in order to generate QMF frequency bands. These QMF frequency bands are not to be mistaken with the analysis subbands outlined in this document. The QMF frequency bands are used for the purpose of manipulating and merging the low and high frequency component of the signal in the frequency domain, rather than in the time domain. The low frequency component 1214 is fed into the transposition unit 1204 which corresponds to the systems for high frequency reconstruction outlined in the present document. The transposition unit 1204 generates a high frequency component 1212, also known as highband, of the signal, which is transformed into the frequency domain by a QMF filter bank 1203. Both, the QMF transformed low frequency component and the QMF transformed high frequency component are fed into a manipulation and merging unit 1205. This unit 1205 may perform an envelope adjustment of the high frequency component and combines the adjusted high frequency component and the low frequency component. The combined output signal is re-transformed into the time domain by an inverse QMF filter bank 1201.

Typically the QMF filter bank 1202 comprise 32 QMF frequency bands. In such cases, the low frequency component 1213 has a bandwidth of $f_s/4$, where $f_s/2$ is the sampling frequency of the signal 1213. The high frequency component 1212 typically has a bandwidth of $f_s/2$ and is filtered through the QMF bank 1203 comprising 64 QMF frequency bands.

In the present document, a method for harmonic transposition has been outlined. This method of harmonic transposition is particularly well suited for the transposition of transient signals. It comprises the combination of frequency domain oversampling with harmonic transposition using vocoders. The transposition operation depends on the combination of analysis window, analysis window stride, transform size, synthesis window, synthesis window stride, as well as on phase adjustments of the analysed signal.

Through the use of this method undesired effects, such as pre- and post-echoes, may be avoided. Furthermore, the method does not make use of signal analysis measures, such as transient detection, which typically introduce signal distortions due to discontinuities in the signal processing. In addition, the proposed method only has reduced computational complexity. The harmonic transposition method according to the invention may be further improved by an appropriate selection of analysis/synthesis windows, gain values and/or time alignment.

The invention claimed is:

1. An audio signal processing device for transposing an input audio signal by a transposition factor T to generate an output audio signal, the audio signal processing device comprising one or more components that:

extract a frame of L time-domain samples of the input audio signal using an analysis window of length L;

convert the L time-domain samples into M complex frequency-domain coefficients;

alter a phase of the complex frequency-domain coefficients using the transposition factor T;

convert the altered frequency-domain coefficients into M altered time-domain samples; and generate a frame of L time-domain output samples of the output audio signal from the M altered time-domain samples using a synthesis window;

wherein the frame of L time-domain output samples of the output audio signal comprises a plurality of high frequency components not present in the frame of L time-domain samples of the input audio signal, at least one of the high frequency components is generated using the transposition factor T, and at least one other of the high frequency components is generated using a second transposition factor $T_2$, wherein T is not equal to $T_2$.

2. The audio signal processing device of claim 1, wherein the analysis window has a length L with zero padding by additional (F−1)*L zeros.

3. The audio signal processing device of claim 1, wherein the one or more components further:

shift the analysis window by an analysis stride along the input audio signal to generate successive frames of the input audio signal;

shift successive frames of L time-domain output samples by a synthesis stride; and overlap and add the successive shifted frames of L time-domain output samples to generate the output signal.

4. The audio signal processing device of claim 3, wherein the one or more components further increase the sampling rate of the output signal by the transposition factor T to yield a transposed output signal.

5. The audio signal processing device of claim 4, wherein the synthesis stride is T times the analysis stride.

6. A method, performed by an audio signal processing device, for transposing an input audio signal by a transposition factor T to generate an output audio signal, the method comprising:

extracting a frame of L time-domain samples of the input audio signal using an analysis window of length L;

transforming the L time-domain samples into M complex frequency-domain coefficients;

altering a phase of the complex frequency-domain coefficients using the transposition factor T;

transforming the altered frequency-domain coefficients into M altered time-domain samples; and generating a frame of L time-domain output samples of the output audio signal from the M altered time-domain samples using a synthesis window;

wherein the frame of L time-domain output samples of the output audio signal comprises a plurality of high frequency components not present in the frame of L time-domain samples of the input audio signal, at least one of the high frequency components is generated using the transposition factor T, and at least one other of the high frequency components is generated using a second transposition factor $T_2$, wherein T is not equal to $T_2$.

7. A non-transitory computer readable medium comprising instructions for execution on an audio signal processing device, wherein, when executed by the audio signal processing device, the instructions cause the audio signal processing device to perform the method of claim 6.

* * * * *